(12) United States Patent
Kubo

(10) Patent No.: US 11,310,064 B2
(45) Date of Patent: Apr. 19, 2022

(54) INFORMATION PROCESSING APPARATUS, INFORMATION PROCESSING SYSTEM, AND INFORMATION PROCESSING METHOD

(71) Applicant: Naohiko Kubo, Kanagawa (JP)

(72) Inventor: Naohiko Kubo, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/791,197

(22) Filed: Feb. 14, 2020

(65) Prior Publication Data

US 2020/0280456 A1 Sep. 3, 2020

(30) Foreign Application Priority Data

| Feb. 28, 2019 | (JP) | JP2019-036791 |
| May 31, 2019 | (JP) | JP2019-103115 |
| Jan. 15, 2020 | (JP) | JP2020-004406 |

(51) Int. Cl.
*H04L 12/18* (2006.01)
*H04L 67/02* (2022.01)

(52) U.S. Cl.
CPC ...... *H04L 12/1818* (2013.01); *H04L 12/1822* (2013.01); *H04L 12/1831* (2013.01); *H04L 67/02* (2013.01)

(58) Field of Classification Search
CPC ............. H04L 12/1818; H04L 12/1822; H04L 12/1831; H04L 67/02
USPC ....................................................... 709/204
See application file for complete search history.

(56) References Cited

U.S. PATENT DOCUMENTS

| 2007/0192410 A1* | 8/2007 | Liversidge | H04L 51/04 709/204 |
| 2008/0162637 A1* | 7/2008 | Adamczyk | H04L 51/043 709/204 |
| 2009/0187625 A1* | 7/2009 | Blackstock | H04L 12/1818 709/204 |
| 2011/0271207 A1* | 11/2011 | Jones | H04W 4/023 715/753 |

(Continued)

FOREIGN PATENT DOCUMENTS

| JP | 2006-146415 | 6/2006 | |
| JP | 2014014065 A | * 1/2014 | ........... H04L 65/403 |

*Primary Examiner* — Umar Cheema
*Assistant Examiner* — Tony Williams
(74) *Attorney, Agent, or Firm* — IPUSA, PLLC

(57) ABSTRACT

An information processing apparatus manages multiple users who operate respective communication terminals to participate in a meeting held in a virtual place. The information processing apparatus includes a memory; and a processor, and is configured to execute managing a participating user who participates in the meeting, based on a notice from a communication terminal operated by the participating user, the notice using a unique identifier for the virtual place, and the unique identifier being unique among identifiers respectively assigned to multiple virtual places; generating data for displaying a web page in a web browser of the communication terminal operated by the participating user; and transmitting the generated data to the communication terminal operated by the participating user, wherein the managing determines whether all participating users have exited the meeting based on notices from the multiple communication terminals, to end the meeting.

12 Claims, 37 Drawing Sheets

(56) References Cited

U.S. PATENT DOCUMENTS

| | | | |
|---|---|---|---|
| 2014/0362742 A1* | 12/2014 | Martinez | H04L 65/403 |
| | | | 370/262 |
| 2014/0368410 A1* | 12/2014 | Imai | H04L 12/1822 |
| | | | 345/2.2 |
| 2015/0002614 A1* | 1/2015 | Zino | H04N 21/4788 |
| | | | 348/14.08 |
| 2016/0088259 A1* | 3/2016 | Anderson | H04L 65/1083 |
| | | | 348/14.03 |

* cited by examiner

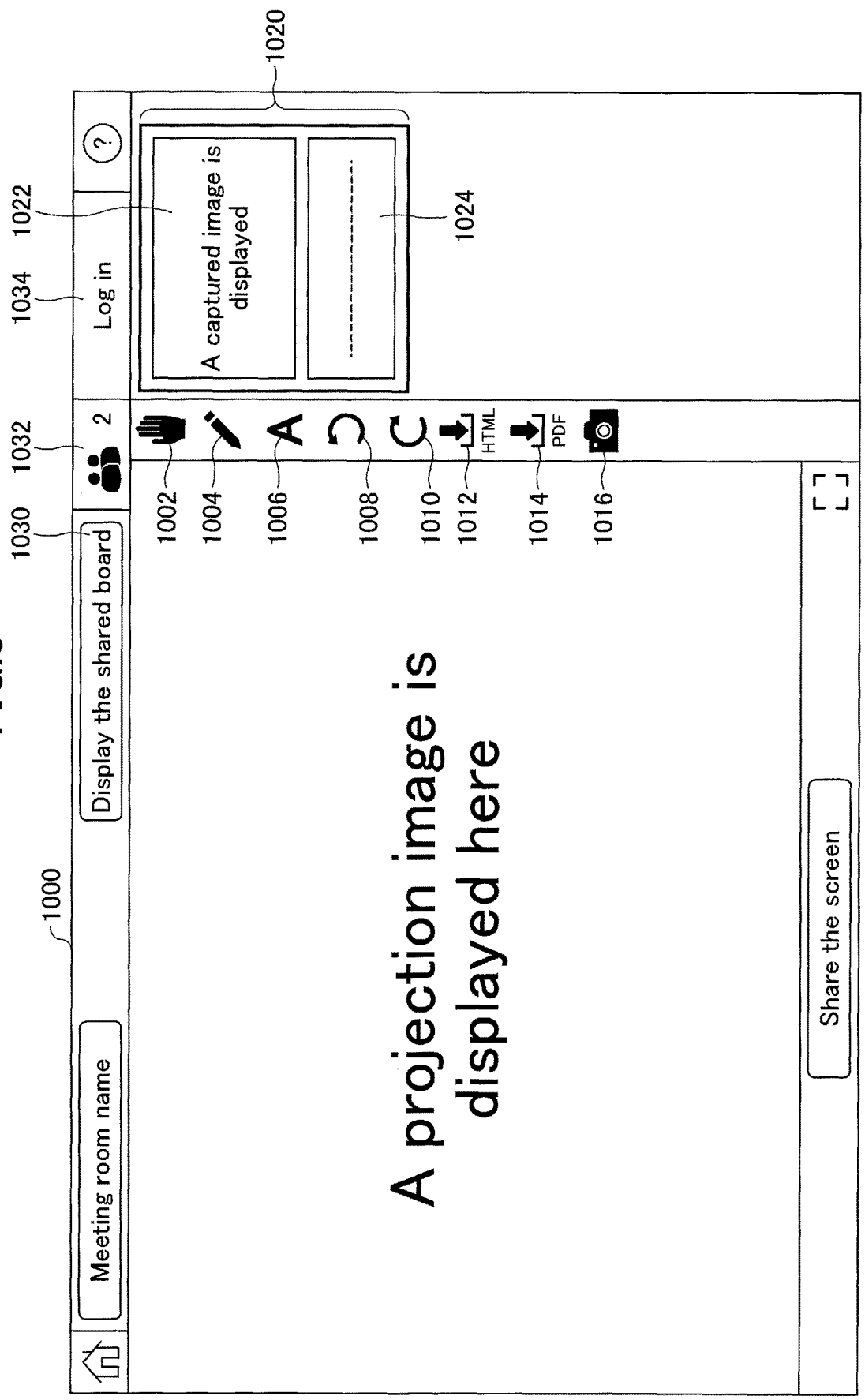

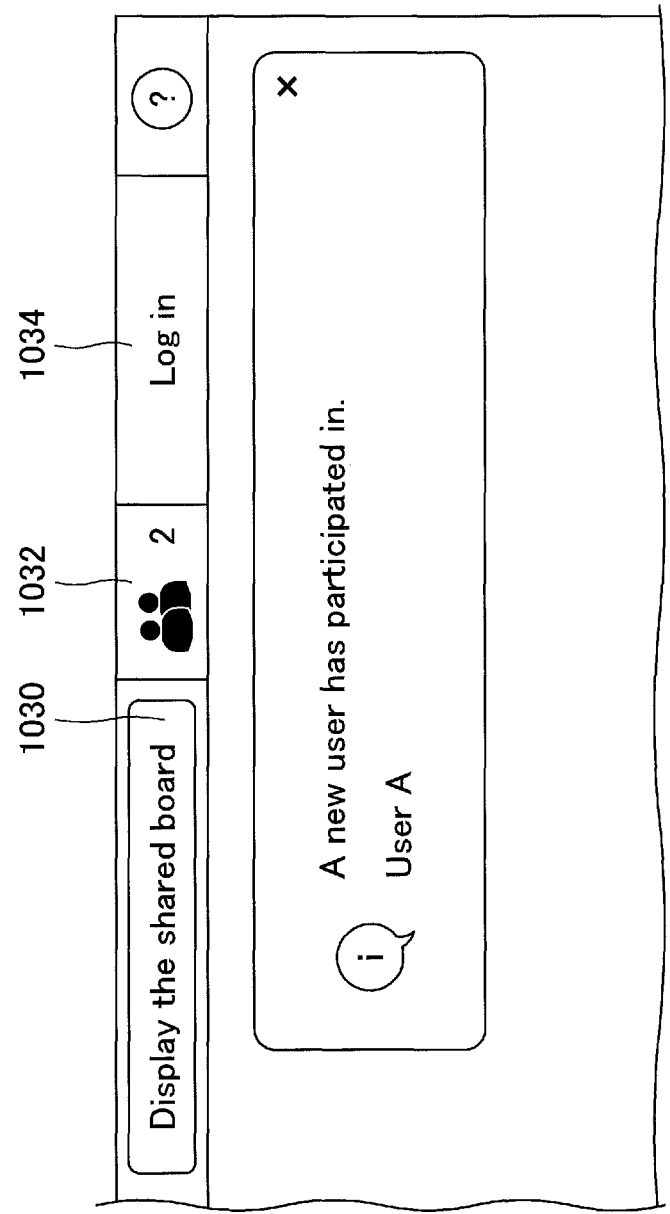

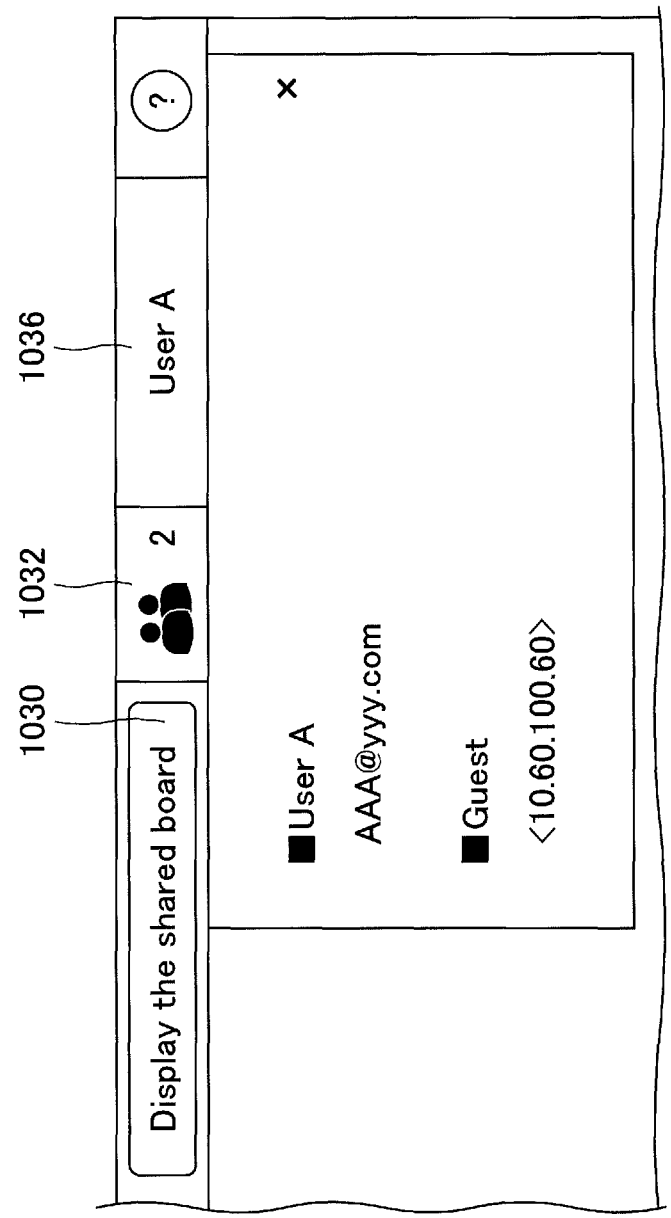

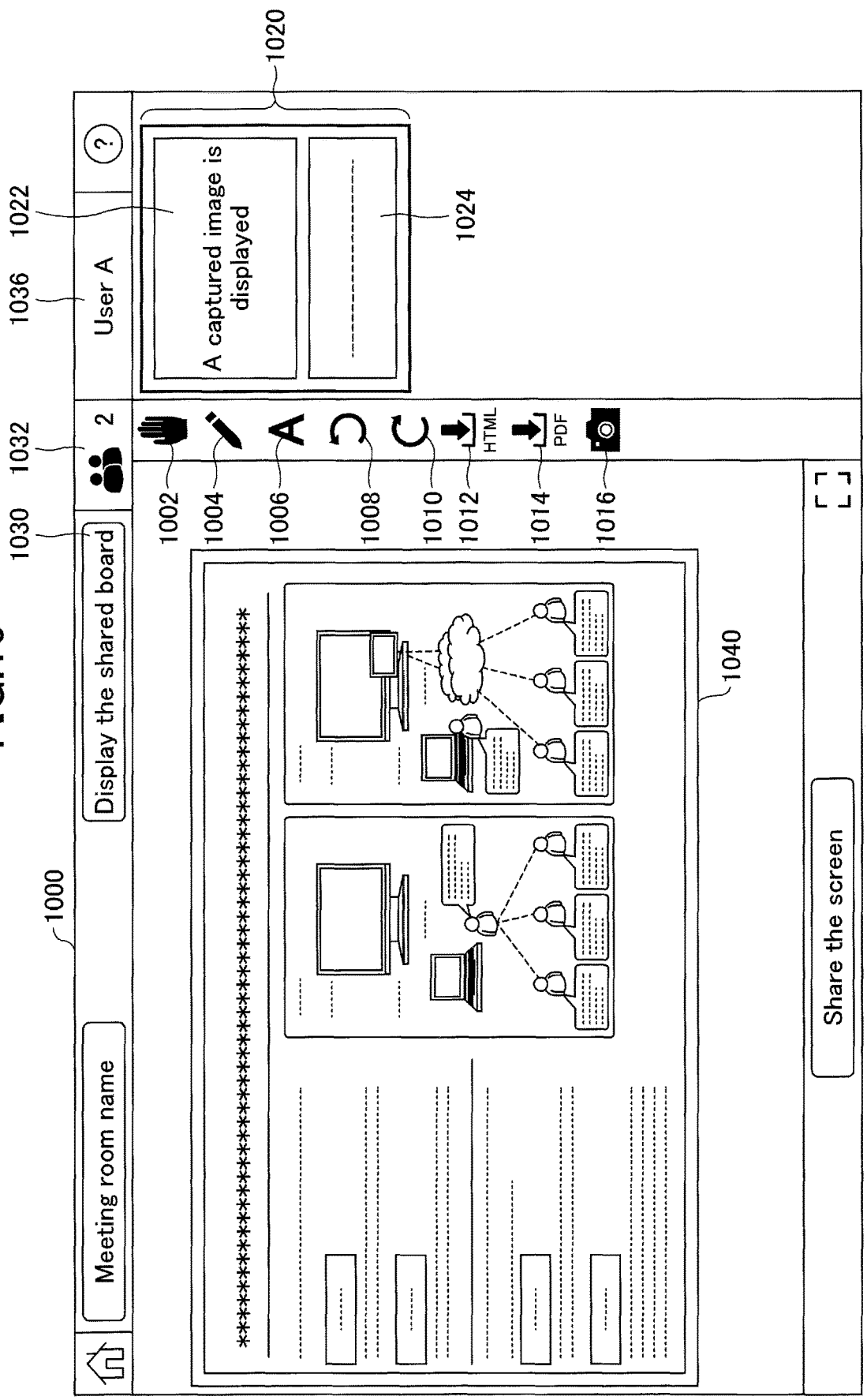

FIG.14

Personal memo management DB

| Personal memo ID | User ID | Room ID | Sheet ID | Captured image | |
|---|---|---|---|---|---|
| Personal memo A | User-a | room-a | 1st sheet: sheet-1 | capture-A1.jpg | ⋮ |
| Personal memo A | User-a | room-a | 2nd sheet: sheet-2 | capture-A2.jpg | ⋮ |
| Personal memo A | User-a | room-a | 3rd sheet: sheet-3 | capture-A3.jpg | ⋮ |
| Personal memo A | User-a | room-a | 4th sheet: sheet-4 | capture-A4.jpg | ⋮ |
| Personal memo A | User-a | room-a | 5th sheet: sheet-5 | capture-A5.jpg | ⋮ |
| Personal memo B | User-b | room-a | 1st sheet: sheet-1 | capture-B1.jpg | ⋮ |
| Personal memo B | User-b | room-a | 2nd sheet: sheet-2 | capture-B2.jpg | ⋮ |
| Personal memo B | User-b | room-a | 3rd sheet: sheet-3 | capture-B3.jpg | ⋮ |
| Personal memo C | User-c | room-a | 1st sheet: sheet-1 | capture-C1.jpg | ⋮ |

FIG.15

Shared memo management DB

| Shared memo ID | Meeting ID | Bibliographic information on meeting |
|---|---|---|
| Shared memo a | room-a | Date and time: Sept. 4, 2018<br>Meeting name: Meeting<br>Location: Meeting room A<br>Self evaluation: ★★<br>... |
| ... | ... | ... |

FIG.16

Personal memo DB

| Personal memo ID | Sheet ID | Content ID | Data of contents | Display position |
|---|---|---|---|---|
| Personal memo A | sheet-1 | c101 | Type: text memo<br>Font type: Mincho<br>Size: 20<br>Text string: aiuoe | (1,1) |
| Personal memo A | sheet-1 | c102 | Type: image<br>File name: xxx.jpg | (200,10) |
| Personal memo A | sheet-1 | c103 | Type: vector<br>Numerical data: ⋯ | (1000,500) |
| ⋯ | | ⋯ | | |

FIG.17

Shared memo DB

| Shared memo ID | Content ID | Data of contents | Display position |
|---|---|---|---|
| Shared memo a | c201 | Type: text<br>Font type: Mincho<br>Size: 20<br>Text string: R | (400,270) |
| Shared memo a | c202 | Type: image<br>File name: yyy.jpg | (400,20) |
| Shared memo a | c203 | Type: vector<br>Numerical data: ... | (120,600) |
| ... | | ... | ... |

FIG.18

| Personal memo ID | Capturing count of streaming | Reference count of capturing (after meeting) | | Write count | | | | | DL as PDF | Meeting participation time | Meeting exit time |
|---|---|---|---|---|---|---|---|---|---|---|---|
| | | Ref. count of all capturings | Ref. count and time of each capturing | Total number of characters | Number of characters in each capturing | Number of handwritten objects (lines, etc.) | Number of handwritten objects in each capturing | Number of handwritten characters | | | |
| Personal memo A | 3 | 5 | 1st sheet 4 2/8,2/9 2nd sheet 1 2/9 … | 200 | 1st sheet 50 2nd sheet 0 … | 40 | 1st sheet 20 2nd sheet 0 … | 10 | No | Feb. 7, 10:01:30 | Feb. 7, 10:30:30 |
| Personal memo B | 2 | 6 | 1st sheet 2 2nd sheet 4 … | 100 | 1st sheet 0 2nd sheet 30 … | 20 | 1st sheet 5 2nd sheet 10 … | 5 | No | Feb. 7, 10:02:10 | Feb. 7, 10:29:30 |
| Personal memo C | 1 | 0 | 0 | 10 | 1st sheet 10 2nd sheet 0 … | 0 | 1st sheet 0 2nd sheet 0 … | 0 | Yes at 2:30 after streaming started | Feb. 7, 09:58:40 | Feb. 7, 10:04:30 |

FIG.19

| Identifier | Meeting ID |
|---|---|
| AAAAA | b807515f-a574-4cd3-b250-5096dd06afef |
| BBBBB | 4a0e876e-90cf-4abf-a278-a8c94626f443 |
| CCCCC | 16fa5ce9-9fe6-4ffb-a22d-c148880 9555b |

FIG.20

| Meeting ID | Meeting name | Meeting room | ... | Participating users (array) | State |
|---|---|---|---|---|---|
| b807515f··· | Custom order meeting | C2101 | ... | [ABC, DEF] | In session |
| 4a0e876e··· | Production meeting | Reception room 002 | ... | [XYZ, OPQ] | In session |
| 16fa5ce9··· | Source code DR | Huddle 001 | ... | [ABC, GHI, RST] | Ended |

FIG.21

| User ID | User name | email | ... |
|---|---|---|---|
| ABC | C | CCC@yyy.com | ... |
| DEF | A | AAA@yyy.com | ... |
| XYZ | B | BBB@yyy.com | ... |

FIG.25A

Example of meeting data in DB

```
{
  "Title": "meeting@C2101",
  "Location": "C2101",
  "CenterMachine": {
    "machineId": "AAAAA"
  },
  "Participants": [
  ],
  "Owner": {
    "userId": "DEF"
  }
}
```

FIG.25B

Example of meeting data in DB

```
{
  "Title": "meeting@C2101",
  "Location": "C2101",
  "CenterMachine": {
    "machineId": "AAAAA"
  },
  "Participants": [
    {
      "userId": "DEF"
    }
  ],
  "Owner": {
    "userId": "DEF"
  }
}
```

FIG.25C

Example of meeting data in DB

```
{
  "Title": "meeting@C2101",
  "Location": "C2101",
  "CenterMachine": {
    "machineId": "AAAAA"
  },
  "Participants": [
    {
      "userId": "DEF"
    },
    {
      "userId": "XYZ"
    }
  ],
  "Owner": {
    "userId": "DEF"
  }
}
```

FIG.30A

Example of meeting data in DB
```
{
  "Title": "meeting@C2101",
  "Location": "C2101",
  "CenterMachine": {
    "machineId": "AAAAA"
  },
  "Participants": [
    {
      "userId": "DEF"
    },
    {
      "userId": "XYZ",
      "state": "left"
    }
  ],
  "Owner": {
    "userId": "DEF"
  }
}
```

FIG.30B

Example of meeting data in DB
```
{
  "Title": "meeting@C2101",
  "Location": "C2101",
  "CenterMachine": {
    "machineId": "AAAAA"
  },
  "Participants": [
    {
      "userId": "DEF",
      "state": "left"
    },
    {
      "userId": "XYZ",
      "state": "left"
    }
  ],
  "Owner": {
    "userId": "DEF"
  }
}
```

FIG.30C

Example of meeting data in DB
```
{
  "Title": "meeting@C2101",
  "State": "Finished",
  "Location": "C2101",
  "CenterMachine": {
    "machineId": "AAAAA"
  },
  "Participants": [
    {
      "userId": "DEF",
      "state": "left"
    },
    {
      "userId": "XYZ",
      "state": "left"
    }
  ],
  "Owner": {
    "userId": "DEF"
  }
}
```

FIG.32

| Date and time | Meeting name | Location | Personal board | Shared board | Self evaluation | Bibliographic information |
|---|---|---|---|---|---|---|
| 2018-10-05 20:30 | Test | | ▪≣ | ▪≣ | ☆☆☆☆☆ | 🗎 |
| 2018-10-05 20:30 | [PERSONAL] | | | | ☆☆☆☆☆ | 🗎 |
| 2018-10-05 10:00 | Daily MTG | room4 | ▪≣ | ▪≣ | ☆☆☆☆☆ | 🗎 |
| 2018-09-05 04:00 | Consultation | room2 | ▪≣ | ▪≣ | ★★★☆☆ | 🗎 |
| 2018-09-04 09:53 | Meeting | Meeting room A | ▪≣ | ▪≣ | ★★☆☆☆ | 🗎 |
| 2018-09-04 07:40 | Meeting | room3 | ▪≣ | ▪≣ | ★★★☆☆ | 🗎 |
| 2018-08-28 13:00 | Training, organization consultation | room1 | ⋯ | ⋯ | | |

Personal portal
Personal history  Settings
🔍 String search — 5020
5000, 5030, 5040, 5050, 5010

FIG.33

Bibliographic information

[Session information]
Event name: regular meeting
Date and time: Dec. 1, 2018, 10:00–11:00
Location: meeting room A on 1F
Organizer: User A
Participants: User B, User C

[Capture information]

Input participant names  Narrow down

| Thumbnail | 1 | 2 | 3 | | | | |
|---|---|---|---|---|---|---|---|
| Capturing count | one | two | one | | | | |

FIG.34
| Captured image | Capturing count |
|---|---|
| 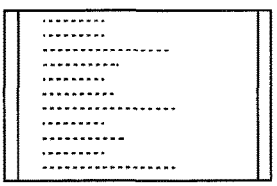<br>20180927134809448.jpg<br>Review of first half | 15 |
| 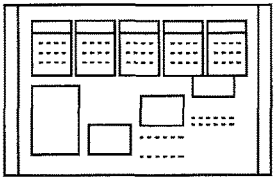<br>20180927135236407.jpg<br>Performance result of FY2017 | 8 |
| 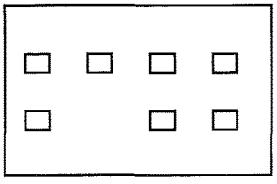<br>20180927151242014.jpg<br>⋯ custom order flow diff ⋯ | 6 |
| 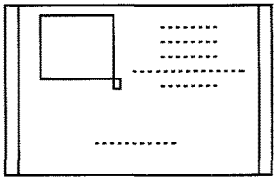<br>20180927133557918.jpg<br>Title page of entire meeting | 5 |
| 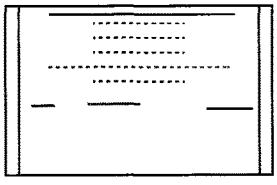<br>20180927134813026.jpg<br>⋯ functional diagram (center ⋯ | 4 |

FIG.35

| User-a | Personal memo A | Number of characters in memo: 200 | | | | | |
|---|---|---|---|---|---|---|---|
| | | Captured images | | | | | |
| | | Memos | | | | | |
| | | Meeting participation time | Feb. 7, 10:01:30 | | | | |
| | | Meeting exit time | Feb. 7, 10:30:30 | | | | |
| | | Interest | High | | | | |

| User-b | Personal memo B | Number of characters in memo: 50 | |
|---|---|---|---|
| | | Captured images | |
| | | Memos | |
| | | Meeting participation time | Feb. 7, 10:02:10 |
| | | Meeting exit time | Feb. 7, 10:29:30 |
| | | Interest | Intermediate |

| User-c | Personal memo C | Number of characters in memo: 30 | |
|---|---|---|---|
| | | Captured images | |
| | | Memos | |
| | | Meeting participation time | Feb. 7, 09:58:40 |
| | | Meeting exit time | Feb. 7, 10:04:30 |
| | | Interest | Low |

INFORMATION PROCESSING APPARATUS, INFORMATION PROCESSING SYSTEM, AND INFORMATION PROCESSING METHOD

BACKGROUND OF THE INVENTION

1. Field of the Invention

The present disclosure relates to an information processing apparatus, an information processing system, and an information processing method.

2. Description of the Related Art

For example, there has been a meeting support system that integrates individual known systems to support meetings with a variety of functions including video and audio recording and playback functions, board writing functions, and personal memo functions; and manages various contents (data) generated by each of the known systems in association with individual meetings, so that the manages contents can be associated with each other to be referred and used (see, for example, Japanese Laid-Open Patent Application No. 2006-146514).

In a conventional meeting system, there was a problem in that the previous real meeting is confused with the next real meeting because if it is not possible to recognize the end of an real meeting held in a virtual meeting room, even when the previous real meeting has ended and the next real meeting is started, it is managed as if the previous real meeting is continuing. Note that the meeting support system of Japanese Laid-Open Patent Application No. 2006-146514 does not solve the problem.

SUMMARY OF THE INVENTION

According to an embodiment in the present disclosure, an information processing apparatus manages a plurality of users who operate a plurality of communication terminals, respectively, to participate in a meeting held in a virtual place. The information processing apparatus includes a memory; and a processor. The processor is configured to execute managing a participating user who participates in the meeting, based on a notice from a communication terminal operated by the participating user, the notice using a unique identifier for the virtual place, and the unique identifier being unique among identifiers each of which is assigned to each virtual place; generating data for displaying a web page in a web browser of the communication terminal operated by the participating user; and transmitting the generated data to the communication terminal operated by the participating user, wherein the managing determines whether all participating users have exited the meeting based on notices from the plurality of communication terminals, to end the meeting.

BRIEF DESCRIPTION OF DRAWINGS

Other objects and further features of embodiments will be apparent from the following detailed description when read in conjunction with the accompanying drawings, in which:

FIG. 8 is an image diagram of an example of a display on a projection screen and a personal board screen before a first screen capturing is performed;

FIGS. 9A to 9C are image diagrams of an example illustrating changes in a personal board screen caused by participation into a room and exit out of the room of a user;

FIG. 10 is an image diagram of an example of a personal board screen on which a projection screen is displayed;

FIG. 14 is a configuration diagram of an example of a personal memo management DB;

FIG. 15 is a configuration diagram of an example of a shared memo management DB;

FIG. 16 is a configuration diagram of an example of a personal memo DB;

FIG. 17 is a configuration diagram of an example of a shared memo DB;

FIG. 18 is a configuration diagram of an example of an interest management DB;

FIG. 19 is a configuration diagram of an example of a meeting association DB;

FIG. 20 is a configuration diagram of an example of a meeting DB;

FIG. 21 is a configuration diagram of an example of a user DB;

FIGS. 25A to 25C are configuration diagrams of an example of meeting data stored in a meeting DB;

FIGS. 30A to 30C are configuration diagrams of an example of meeting data stored in a meeting DB;

FIG. 32 is a diagram illustrating an example of a display on a personal portal screen;

FIG. 33 is a diagram illustrating an example of a display of a bibliographic information screen;

FIG. 34 is an explanatory diagram of an example of captured information on a bibliographic information screen;

FIG. 35 is an explanatory diagram of an example of captured information on a bibliographic information screen.

DETAILED DESCRIPTION OF THE EMBODIMENTS

In the following, embodiments will be described in detail with reference to the drawings. According to one embodiment in the present disclosure, it is possible to avoid confusion of meetings held in a virtual place. Note that the present embodiments describe examples of an information sharing system used for meetings that can use a common use board and personal boards. However, embodiments are not limited as such. The present embodiments are not limited to a conference, and can be applied to various information processing systems, such as seminars, lectures, and classes, as long as the event is held with participation of multiple people. Note that when participating in the event to be held, the persons may actually gather and participate in the same location, or the persons may participate in different locations. Also, the present embodiments describe examples of a remote meeting where there is a user connected remotely. However, all users may be in the same room, and users do not need to be physically separated from each other.

First Embodiment

<Overview of Information Sharing System During Meetings>

Figure 1:
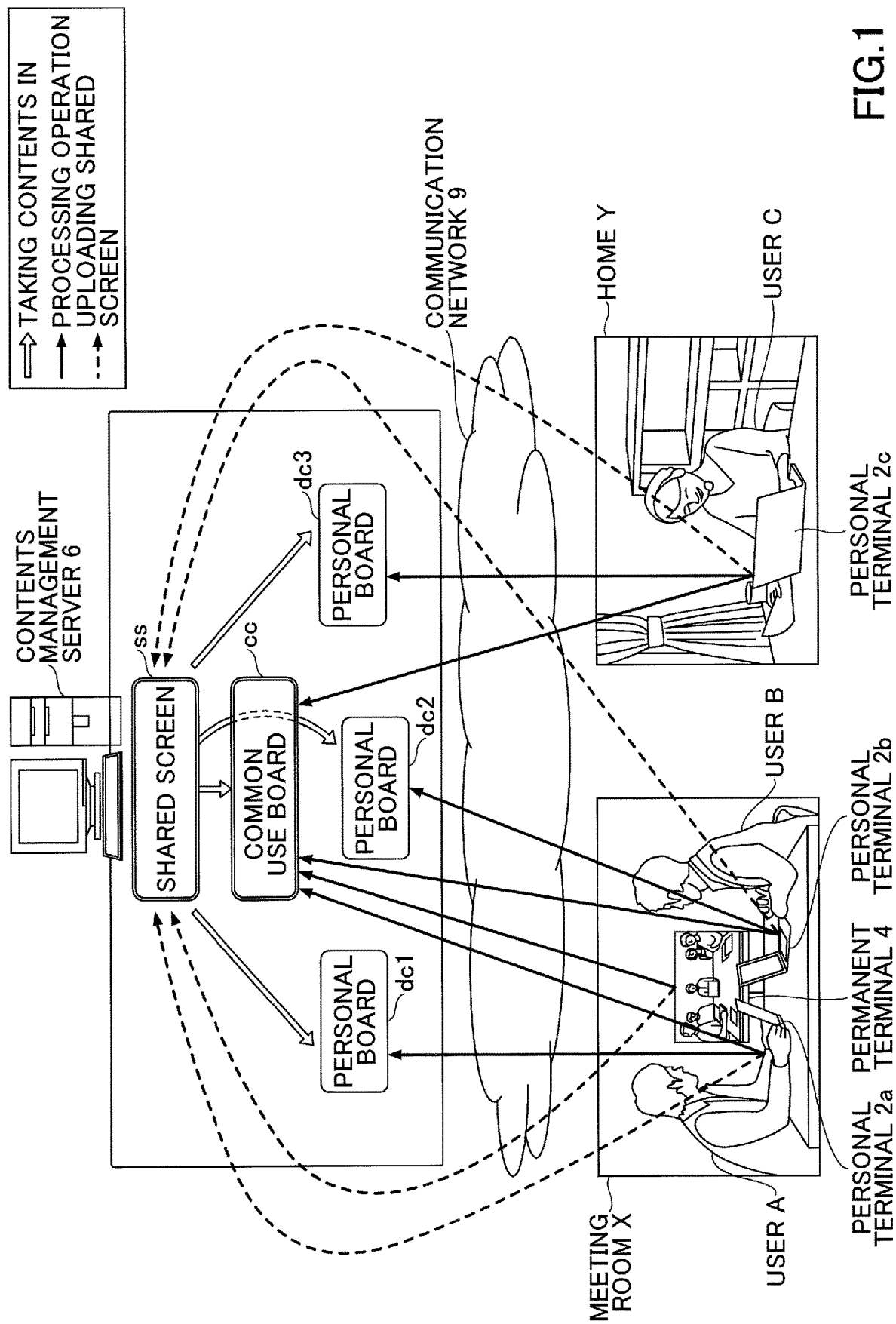
FIG. 1 is an overview diagram of an information sharing system during a meeting.

First, an overview of an information sharing system during a meeting will be described with reference to FIG. 1. FIG. 1 is an overview diagram of an information sharing system during a meeting. Here, a state is illustrated where users A and B in a meeting room X of a company and a user C at his/her home Y have a remote meeting using the information sharing system. The user A brings a personal terminal 2a and the user B brings a personal terminal 2b into the meeting room X. Also, the meeting room X has a permanent terminal 4 installed, which can be commonly used by multiple users. Note that the permanent terminal 4 is not indispensable. The information sharing system may have a configuration without the permanent terminal 4. The user C brings his/her personal terminal 2c into his/her home Y. In the following, the personal terminals 2a, 2b, and 2c may be denoted as "personal terminal(s) 2" when referring to these generically.

The personal terminal 2 is a computer which a user can use individually (exclusively) and can browse the screen. The permanent terminal 4 is a computer which can be used by multiple users commonly to browse the screen.

The personal terminal 2 may be, for example, a notebook PC (Personal Computer), a desktop PC, a cellular phone, a smartphone, a tablet terminal, a wearable PC, or the like. Note that the personal terminal 2 and the permanent terminal 4 are examples of communication terminals (or information processing terminals).

The permanent terminal 4 may be, for example, a PJ (Projector), an IWB (Interactive White Board having electronic blackboard functions capable of mutual communication, a digital signage, a display connected with a stick PC, or the like. Note that the permanent terminal 4 is an example of a communication terminal (or information processing terminal) with a monitor intended to be permanently installed in a meeting room. The permanent terminal 4 is, for example, an information processing terminal with a large-size monitor to be permanently installed in a meeting room, and is assumed to have a use mode of displaying a screen shared by multiple users. Note that the permanent terminal 4 is not an indispensable element.

The personal terminals 2 and the permanent terminal 4 can communicate with a content management server 6 via a communication network 9 such as the Internet. The communication network 9 may be one or more LANs (Local Area Networks) inside a firewall, and in addition to the LAN, may include the Internet outside the firewall. Furthermore, it may also include a VPN (Virtual Private Network) and/or a Wide Area Ethernet (registered trademark). The communication network 9 may be constituted with wires or radio, or, wires or radio may be combined. Also, if connected by a cellular network such as 3G, LTE (Long Term Evolution), 4G, or the like, a LAN is not required.

The content management server 6 is a computer that functions as a web server (or an HTTP server) that stores and manages data of contents to be transmitted to the personal terminals 2 and the permanent terminal 4. The contents management server 6 includes a memory 6000, which will be described later.

Memory locations (or memory areas) are constructed in the memory 6000 for implementing personal boards dc1 to dc3, each of which can be accessed only from a corresponding one of the personal terminals 2. The personal terminals 2a, 2b, and 2c can only access the personal boards dc1, dc2, and dc3, respectively. In the following, the personal boards dc1, dc2 and dc3 may be denoted as "personal board(s) dc" when referring to these generically. The contents management server 6 may support cloud computing. Cloud computing is a use form in which resources on a network are used without being aware of specific hardware resources.

Also, a memory location (or memory area) is constructed in the memory 6000 of the contents management server 6 for implementing a common use board cc that can be accessed from the personal terminals 2. Further, a memory location (or memory area) is constructed in the memory 6000 of the contents management server 6 for implementing a shared screen ss that can be accessed from the personal terminals 2.

The personal boards dc and the common use board cc are virtual spaces generated in the memory locations (or memory areas) in the memory 6000 of the contents management server 6. The personal boards dc and the common use board cc can be accessed by a web application for example, that have functions to browse and edit a content using a Canvas element, a JavaScript (registered trademark), and the like. The web application represents software used on a web browser application (hereafter, referred to as a "web browser") or a mechanism of the software that operates with a program written in a scripting language (e.g., JavaScript) running on the web browser interoperating with a program running on the web server. The personal boards dc and the common use boards cc may have finite or infinite areas with a range of the memory area in the memory 6000. For example, the personal boards dc and the common use board cc may be finite or infinite in both of the vertical and horizontal directions, or may be finite or infinite in either one of the vertical and horizontal directions.

Also, the shared screen ss is a virtual space generated in a memory location (or a memory area) in the memory 6000 of the content management server 6. The shared screen ss differs from the personal boards dc and the common use board cc, and simply has a function to hold data of contents to be transmitted (distributed) to the personal terminals 2 and/or the permanent terminal 4, and to hold the previous contents until the next contents are obtained. The shared screen ss can be accessed by a web application having a function to browse the contents.

Further, the personal board dc is a personal electronic space for each user participating in a remote meeting. The personal terminal 2 of each user can access only the personal board dc of the user, on which it is possible to browse and edit (input, delete, copy, etc.) contents such as texts, images, and the like. The common use board cc is an electronic space for users participating in a remote meeting. The personal terminals 2 of the respective users can access the common use board cc, on which it is possible to browse and edit contents such as texts, images, and the like.

Also, the shared screen ss is an electronic space for users participating in a remote meeting. All of the personal terminals 2 of the users can access the shared screen ss, and can browse the shared screen ss. The shared screen ss differs from the personal boards dc and the common use board cc, and simply has a function to hold data of contents to be transmitted (distributed) to the personal terminals 2 and/or the permanent terminal 4, and to hold the previous contents until the next contents are obtained.

For example, after having transmitted data of contents from the personal terminal 2a to the shared screen ss, in the case where data of contents is transmitted from the personal terminal 2b to the shared screen ss, the data of contents held by the shared screen ss is the data most recently received that has been transmitted the personal terminal 2b. For example, the shared screen ss displays a computer screen, such as an application screen shared by the users.

The contents management server 6 manages information on contents spreading over the shared screen ss, the common use board cc, and the personal boards dc in association with each other for each meeting held in a virtual meeting room (hereafter, simply referred to as a "room"). Accordingly, even when the contents management server 6 manages multiple rooms, data of contents is not communicated between different rooms.

Each personal terminal 2 can display contents of the personal boards dc, the common use board cc, and the shared screen ss in meetings attended by the user by the installed web application of the web browser. Therefore, it is possible to hold a meeting in a state close to that in a real meeting room.

Such an information sharing system enables the user to open an personal file by an application to share it on the shared screen ss; to commonly use handwriting and object arrangement on the common use board cc; to take contents shared on the shared screen ss in the personal board dc as a personal material; and to hold the handwriting and object arrangement as personal notes on the personal board dc.

Figure 36:
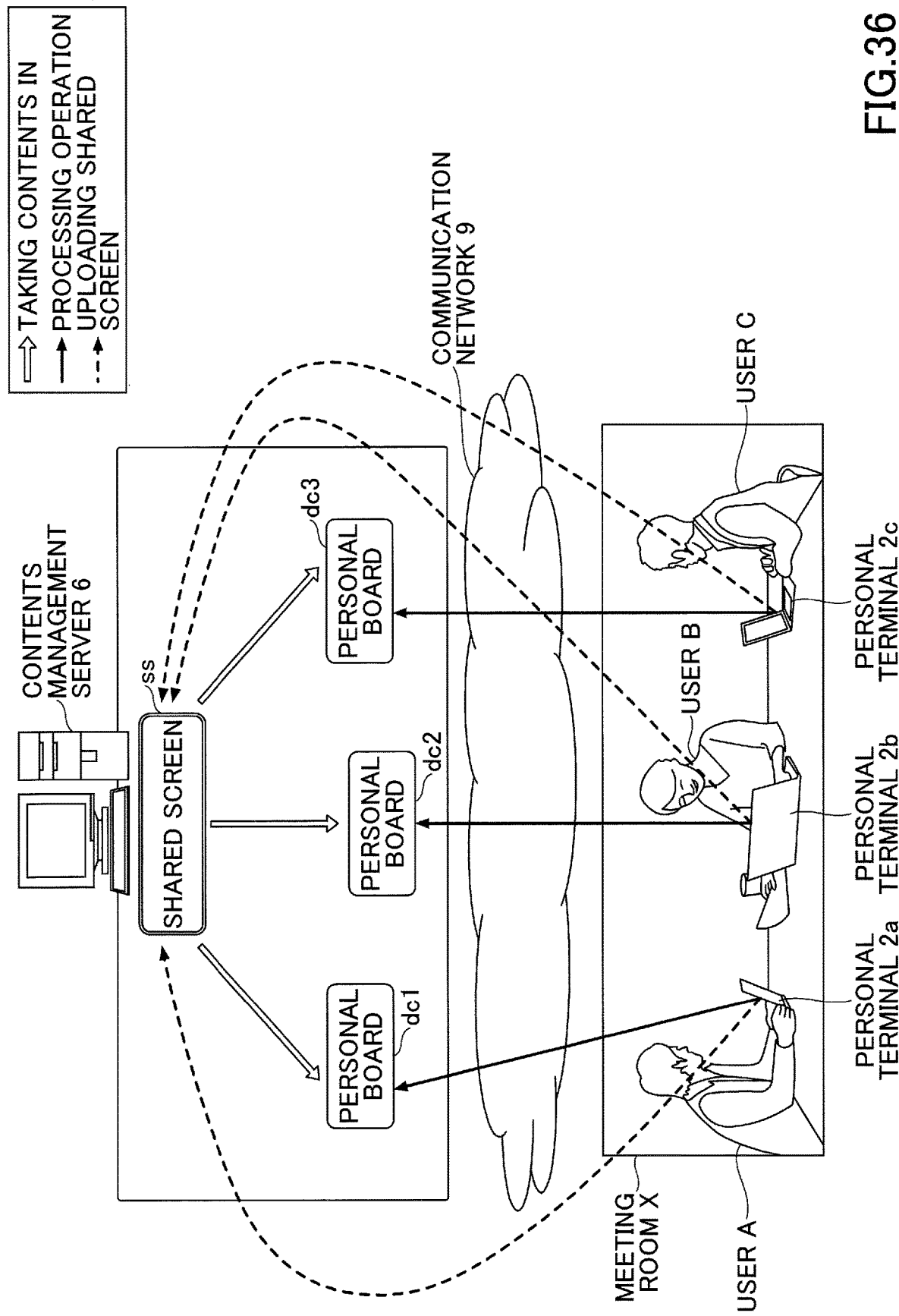
FIG. 36 is an overview diagram of an information sharing system during a meeting.

Note that the information sharing system in FIG. 1 is merely an example, and one or more of the shared screen ss, the common use board cc, and the personal boards dc may not be provided. For example, an information sharing system in FIG. 36 is an example that is configured with the shared screen ss and the personal boards dc, without the use board cc. In the information sharing system in FIG. 36, each personal terminal 2 can display the contents of the personal board dc and the shared screen ss in a room in which the user has participated by the web application of the installed web browser.

<Overview of Personal Portal in Information Sharing System>

Figure 2:
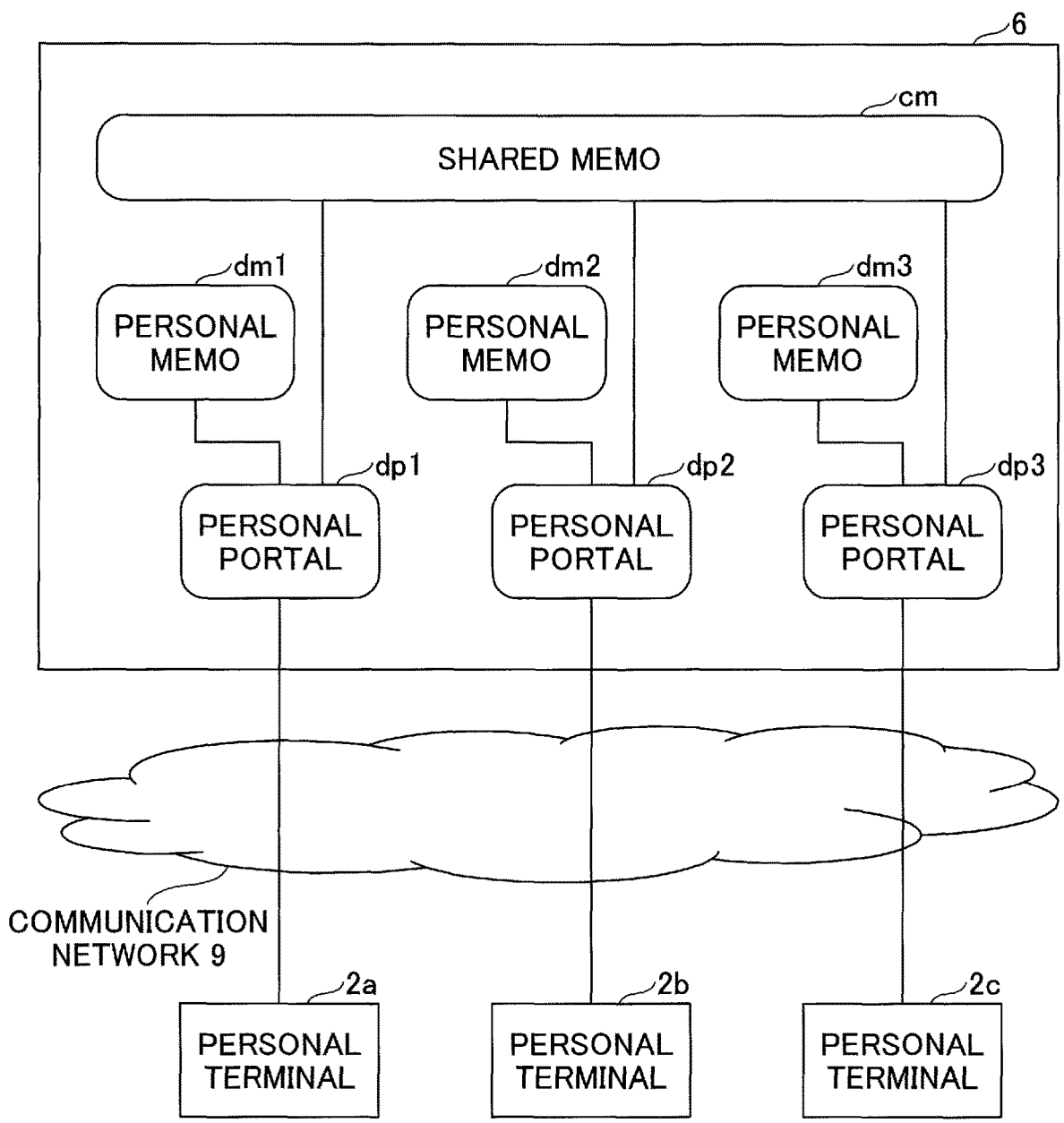
FIG. 2 is an example diagram illustrating an overview of personal portals in an information sharing system.

Next, an overview of a personal portal will be described with reference to FIG. 2. FIG. 2 is an example diagram illustrating an overview of personal portals in an information sharing system. The contents management server 6 generates data items of the personal portal screens dp1, dp2, and dp3 dedicated to the personal terminals 2 and displays the data items on the personal terminals 2, respectively. In the following, the personal portal screens dp1, dp2, and dp3 may be denoted as "personal portal screen(s) dp" when referring to these generically.

In the contents management server 6, the shared memo cm as contents edited on the common use board cc in FIG. 1 during a meeting; and the personal memos dm1, dm2 and dm3 as contents edited using the personal boards dc are stored to be managed. In the following, the personal memos dm1, dm2 and dm3 may be denoted as "personal memo(s) dm" when referring to these generically. By accessing the personal portal screen dp dedicated to each personal terminal 2, the user can display a list of meetings in which the user who is operating the personal terminal 2 has participated.

The user can display the shared memo cm, the personal memos dm, and bibliographic information for each of the meeting, from the list of meetings displayed on the personal portal screen dp, as will be described later. Therefore, in the case of reviewing the contents of a meeting, it is possible for the user to readily display the shared memo cm, the personal memos dm, and the bibliographic information on the meeting. Also, by accessing the personal portal screen dp dedicated to each personal terminal 2, the user can search for a desired meeting by keywords (string) from the list of meetings of the user who is operating the personal terminal 2, as will be described later. Note that as a search object to be used by the string search, bibliographic information on a meeting, text data and handwritten characters included in the personal memo dm, evaluation of a meeting by the user, and the like are used. Note that bibliographic information on a meeting is included in meeting information.

<Hardware Configuration>
<<Computer>>

Figure 3:
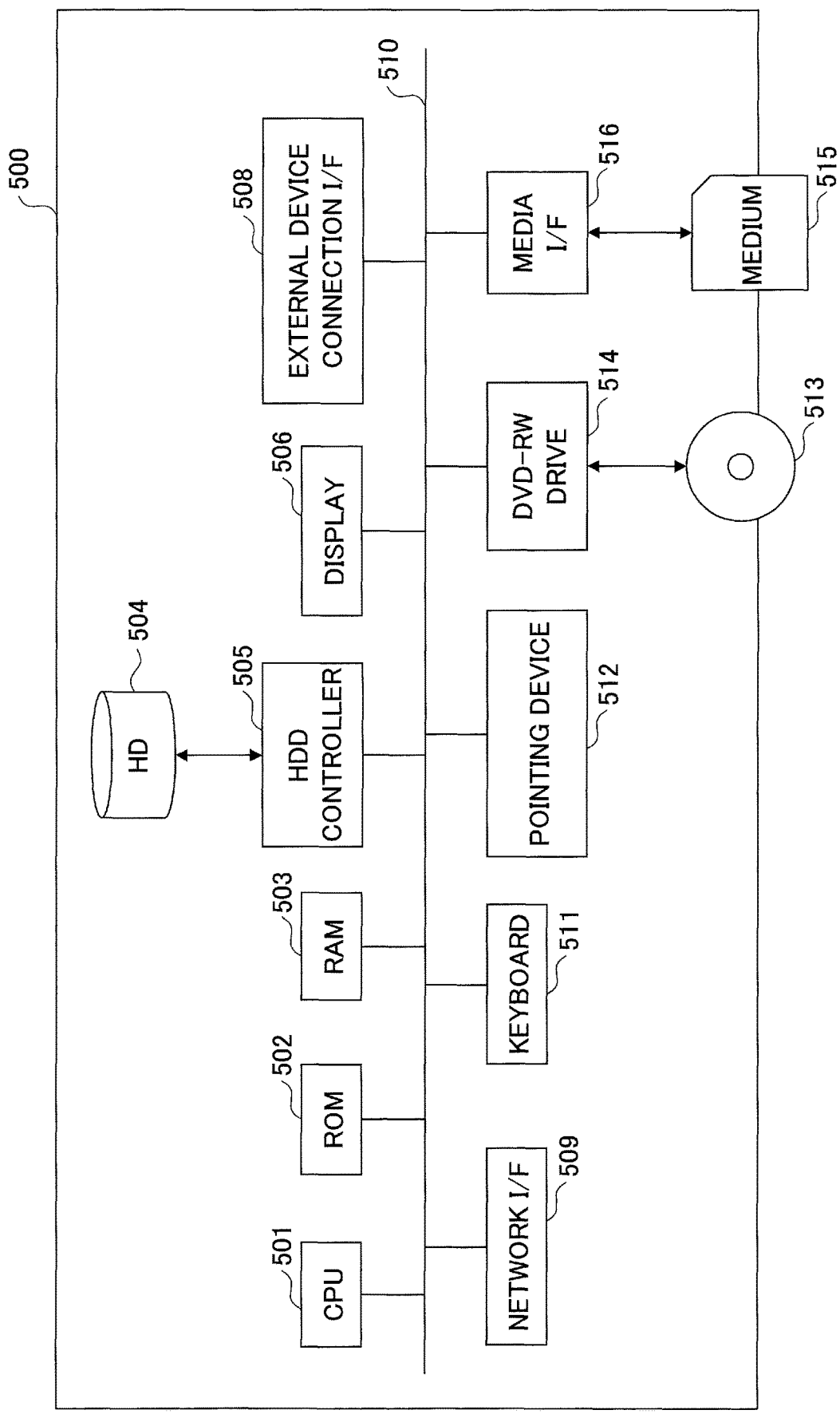
FIG. 3 is an example of a hardware configuration diagram of a computer according to the present embodiment.

The contents management server 6 is implemented by a computer 500 having a hardware configuration, for example, illustrated in FIG. 3. Also, in the case of the personal terminal 2 being a PC as an example of an information processing terminal, the PC is implemented by a computer 500 having a hardware configuration, for example, illustrated in FIG. 3.

FIG. 3 is an example of a hardware configuration diagram of a computer 500 according to the present embodiment. As illustrated in FIG. 3, the computer 500 includes a CPU (Central Processing Unit) 501, a ROM (Read-Only Memory) 502, a RAM (Random Access Memory) 503, an HD 504, a HDD (Hard Disk Drive) controller 505, a display 506, an external device connection I/F (Interface) 508, a network I/F 509, a data bus 510, a keyboard 511, a pointing device 512, a DVD-RW (Digital Versatile Disk Rewritable) drive 514, and a media I/F 516.

Among these, the CPU 501 controls operations of the entire computer 500. The ROM 502 stores programs used for driving the CPU 501, such as an IPL. The RAM 503 is used as a work area of the CPU 501. The HD 504 stores various items of data of programs and the like. The HDD controller 505 controls reading or writing of various items of data with respect to the HD 504 according to the control of the CPU 501.

The display 506 displays various information items such as cursors, menus, windows, characters, images, and the like. The external device connection I/F 508 is an interface for connecting various external devices. In this case, the external device may be, for example, a USB (Universal Serial Bus) memory or a printer. The network I/F 509 is an interface for performing data communication using the communication network 9. The data bus 510 includes an address bus, a data bus, and the like for electrically connecting components including the CPU 501.

The keyboard 511 is a type of input device having multiple keys for inputting characters, numbers, various commands, and the like. The pointing device 512 is a type of input device for selecting and executing various commands, selecting an object to be processed, moving a cursor, and the like. The DVD-RW drive 514 controls reading or writing various items of data with respect to the DVD-RW 513 as an example of a removable recording medium. Note that it is not limited to a DVD-RW, but may be a DVD-R, and the like. The media I/F 516 controls reading or writing (storage) of data with respect to a recording medium 515, such as a flash memory.

<Smartphone>

Figure 4:
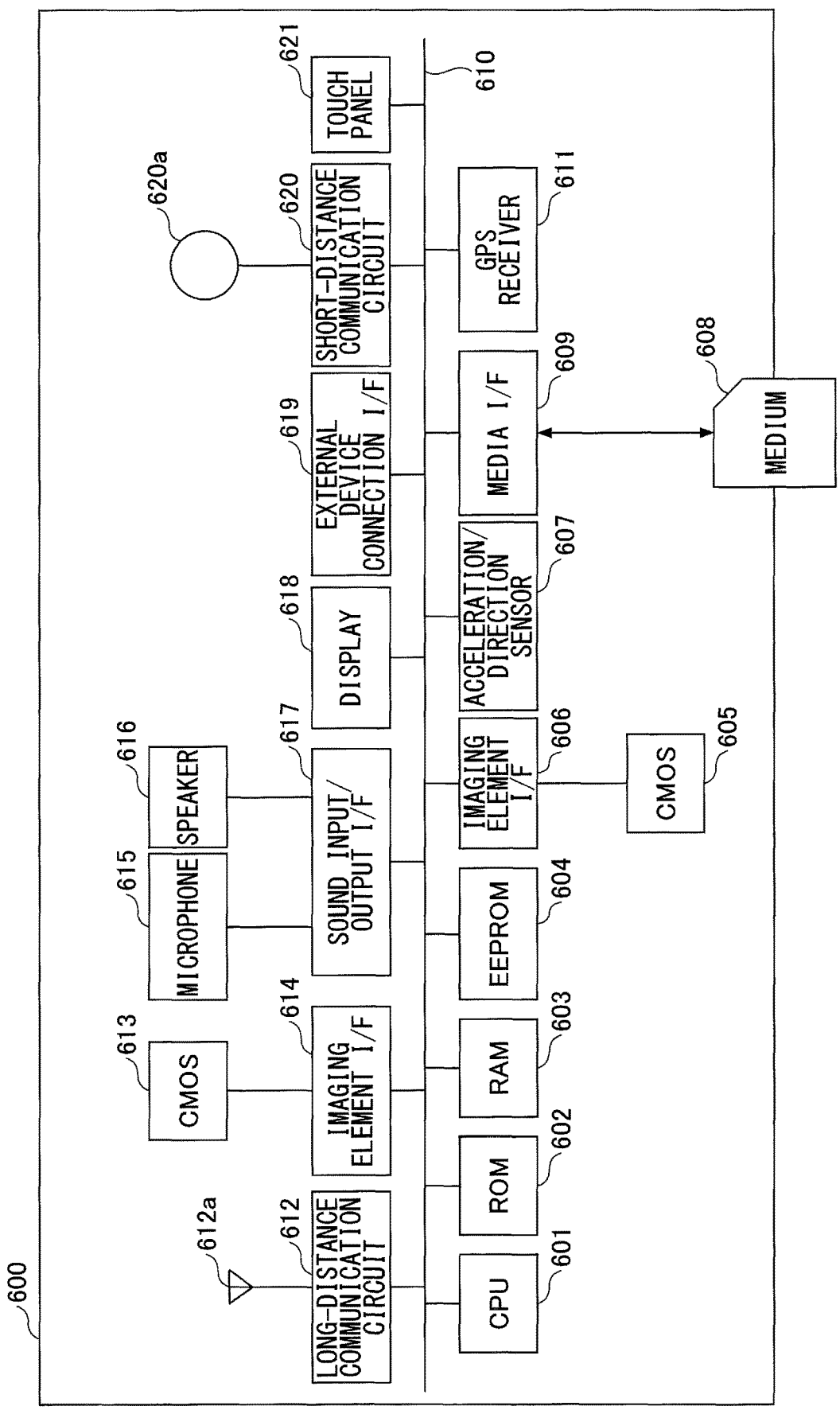
FIG. 4 is an example of a hardware configuration diagram of a smartphone according to the present embodiment.

The personal terminal 2 as an example of an information processing terminal may be implemented by, for example, a smartphone 600 having the hardware configuration illustrated in FIG. 4.

FIG. 4 is an example of a hardware configuration diagram of a smartphone 600 according to the present embodiment. As illustrated in FIG. 4, the smartphone 600 includes a CPU 601, a ROM 602, a RAM 603, an EEPROM 604, a CMOS sensor 605, an imaging element I/F 606, an acceleration/direction sensor 607, a media I/F 609, and a GPS receiver 611.

Among these, the CPU 601 controls operations of the entire smartphone 600. The ROM 602 stores programs used for driving the CPU 601, such as an IPL. The RAM 603 is used as a work area of the CPU 601. The EEPROM 604 reads or writes various items of data of a smartphone program and the like according to the control of the CPU 601.

The CMOS (Complementary Metal Oxide Semiconductor) sensor 605 is a type of built-in imaging device to capture an image of a subject (mainly a self-portrait) to obtain image data according to the control of the CPU 601. Note that the imaging device may be an imaging device other than the CMOS sensor 605, such as a CCD (Charge Coupled Device) sensor. The imaging element I/F 606 is a circuit to control driving the CMOS sensor 605. The acceleration/direction sensor 607 may include a variety of sensors, such as an electromagnetic compass to detect the geomagnetism, a gyrocompass, an acceleration sensor, and the like.

The media I/F 609 controls reading or writing (storage) of data with respect to a recording medium 608, such as a flash memory. The GPS receiver 611 receives GPS signals from GPS satellites.

Also, the smartphone 600 includes a long-distance communication circuit 612, a CMOS sensor 613, an imaging element I/F 614, a microphone 615, a speaker 616, a sound input/output I/F 617, a display 618, an external device connection I/F 619, a short-distance communication circuit 620, an antenna 620a for the short-distance communication circuit 620, and a touch panel 621.

Among these, the long-distance communication circuit 612 is a circuit to communicate with other devices via the communication network 9. The CMOS sensor 613 is a type of built-in imaging device to capture an image of a subject to obtain image data according to the control of CPU 601. The imaging element I/F 614 is a circuit to control driving the CMOS sensor 613. The microphone 615 is a built-in circuit to convert sound into an electrical signal. The speaker 616 is a built-in circuit to convert an electrical signal into physical vibration to produce sound such as music and voice.

The sound input/output I/F 617 is a circuit to process input and output of a sound signal between the microphone 615 and the speaker 616 according to the control of the CPU 601. The display 618 is a type of display device such as a liquid crystal or an organic EL (Electro Luminescence) to display images of subjects, various icons, and the like.

The external device connection I/F 619 is an interface for connecting various external devices. The short-distance communication circuit 620 is a communication circuit of Near Field Communication (NFC), Bluetooth (registered trademark), or the like. The touch panel 621 is a type of input device to operate the smartphone 600 when the user presses the display 618.

Also, the smartphone 600 includes a bus line 610. The bus line 610 includes an address bus, a data bus, and the like for electrically connecting components including the CPU 601 illustrated in FIG. 4.

<<Projector>>

Figure 5:
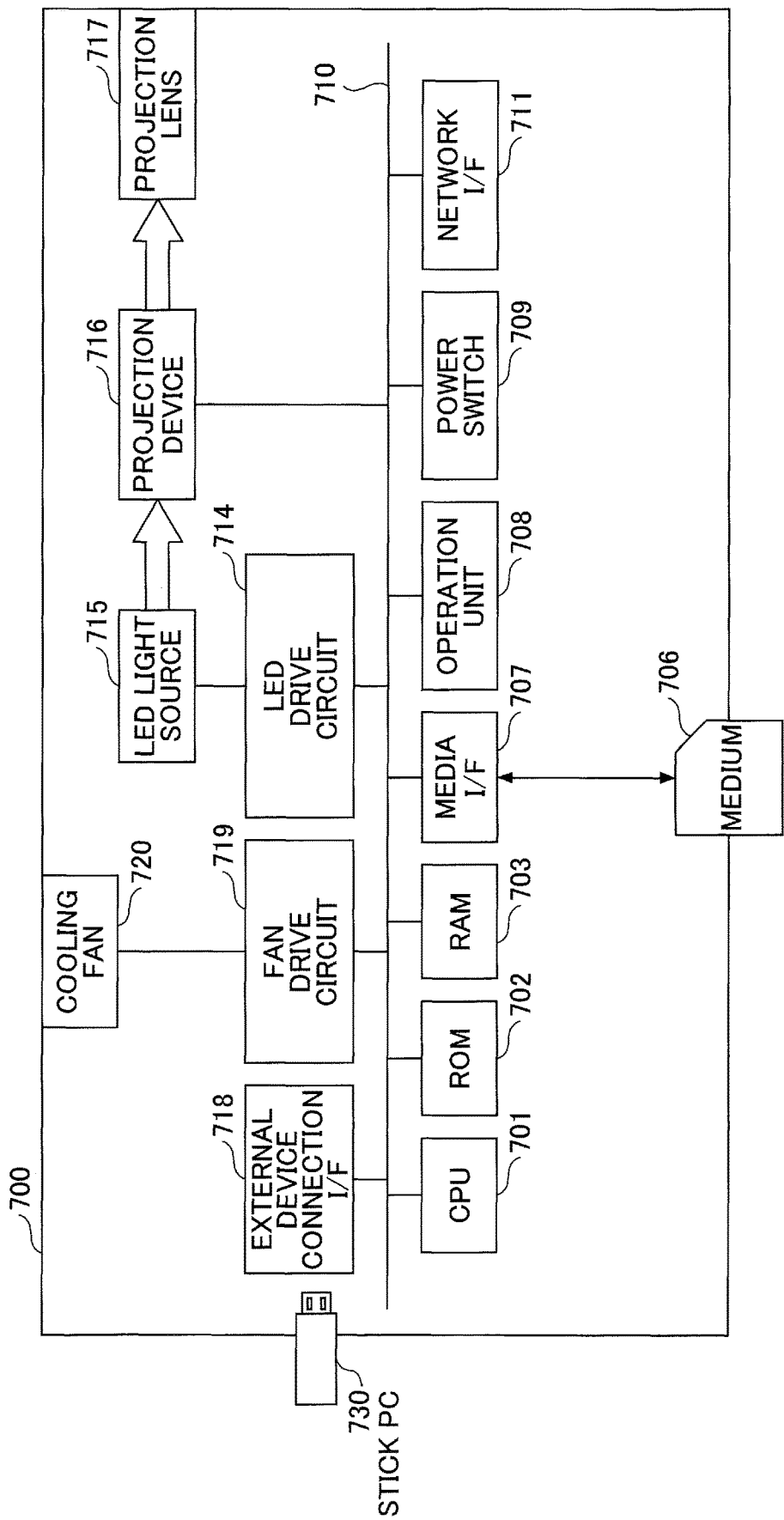
FIG. 5 is an example of a hardware configuration diagram of a projector according to the present embodiment.

The projector 700 as an example of the permanent terminal 4 may be implemented by, for example, a hardware configuration illustrated in FIG. 5.

FIG. 5 is an example of a hardware configuration diagram of a projector 700 according to the present embodiment. As illustrated in FIG. 5, the projector 700 includes a CPU 701, a ROM 702, a RAM 703, a media I/F 707, an operation unit 708, a power switch 709, a bus line 710, a network I/F 711, an LED (Light Emitting Diode) drive circuit 714, an LED light source 715, a projection device 716, a projection lens 717, an external device connection I/F 718, a fan drive circuit 719, and a cooling fan 720.

Among these, the CPU 701 controls operations of the entire projector 700. The ROM 702 stores a program used for driving the CPU 701. The RAM 703 is used as a work area of the CPU 701. The media I/F 707 controls reading or writing (storage) of data with respect to a recording medium 706, such as a flash memory.

The operation unit 708 is provided with various keys, buttons, LEDs, and the like, to be used for performing various operations by the user, other than turning on and off the power supply of the projector 700. For example, the operation unit 708 receives command operations such as a size adjustment operation, a color tone adjustment operation, a focus adjustment operation, a keystone adjustment operation, and the like in the projected image to output received operational contents to the CPU 701.

The power switch 709 is a switch for switching on and off of the power of the projector 700. The bus line 710 illustrated in FIG. 5 includes an address bus, a data bus, and the like for electrically connecting components including the CPU 701. The network I/F 711 is an interface for performing data communication using the communication network 9 such as the Internet.

The LED drive circuit 714 controls turning on and off the LED light source 715 under control of the CPU 701. Once turned on by control of the LED drive circuit 714, the LED source 715 emits projection light through the projection device 716. Based on image data given via the external device connection I/F 718 or the like, the projection device 716 projects modulated light obtained by modulating the projected light from the LED light source 715 by a spatial light modulation method, as an image onto the projection surface of the screen through the projection lens 717. As the projection device 716, a liquid crystal panel, a DMD (Digital Micromirror Device), or the like may be used.

The LED drive circuit 714, the LED light source 715, the projection device 716, and the projection lens 717 described above collectively function as a projector to project an image onto a projection surface based on image data.

The external device connection I/F 718 is directly connected with the PC (Personal Computer), to obtain control signals and image data from the PC. Also, the external device connection I/F 718 is an interface for connecting various external devices (a stick PC 730, etc.). The fan drive circuit 719 is connected with the CPU 701 and the cooling fan 720 to drive and stop the cooling fan 720, based on a control signal from the CPU 701. The cooling fan 720 rotates to vent air from the interior of the projector 700 so as to cool the interior of the projector 700.

Also, when power is supplied, the CPU 701 is activated according to a control program stored in advance in the ROM 702, provides a control signal to the LED drive circuit 714 to turn on the LED light source 715, and provides a control signal to the fan drive circuit 719 to rotate the cooling fan 720 at a predetermined rated speed. Also, once the power supply from the power supply circuit is started, the projector 700 transitions to a state where the projection device 716 is ready to display an image, and the power is further supplied from the power supply circuit to various other components. Also, once the power switch 709 of the projector 700 has been turned off, a power off signal is transmitted from the power switch 709 to the CPU 701.

Upon detecting a power off signal, the CPU 701 provides a control signal to the LED drive circuit 714 to turn off the LED light source 715. Thereafter, when a predetermined period of time elapses, the CPU 701 provides a control signal to the fan driving circuit 719 to stop the cooling fan 720, and terminate its own control process by itself, and finally stops the power supply by giving a command to the power supply circuit.

<<IWB>>

Figure 6:
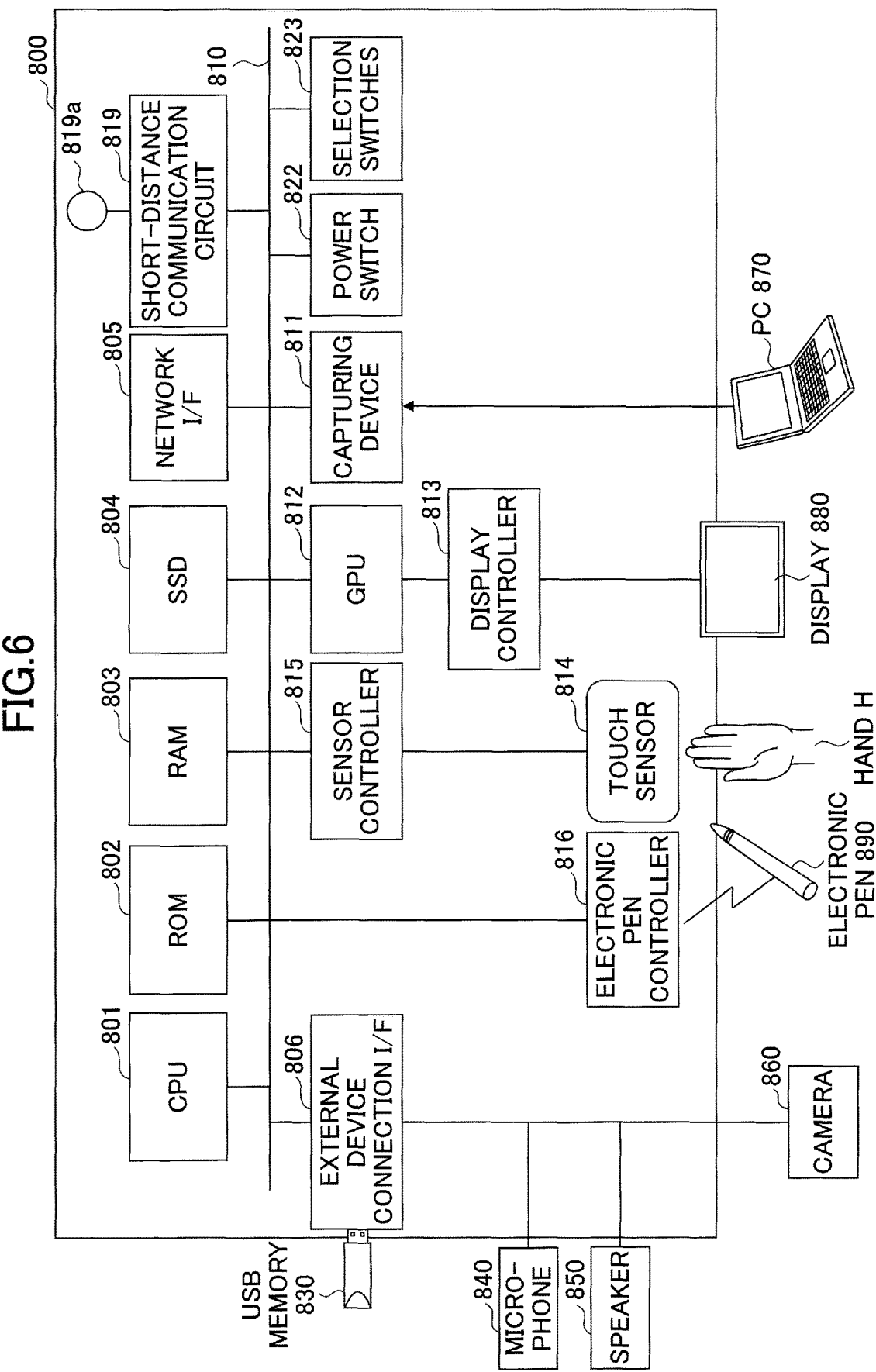
FIG. 6 is an example of a hardware configuration diagram of an IWB accordance to the present embodiment.

An IWB 800 as an example of the permanent terminal 4 may be implemented by, for example, a hardware configuration illustrated in FIG. 6.

FIG. 6 is an example of a hardware configuration diagram of an IWB 800 according to the present embodiment. As illustrated in FIG. 6, the IWB 800 includes a CPU 801, a ROM 802, a RAM 803, an SSD (Solid State Drive) 804, a network I/F 805, and an external device connection I/F 806.

Among these, the CPU 801 controls operations of the entire IWB 800. The ROM 802 stores programs used for driving the CPU 801, such as an IPL. The RAM 803 is used as a work area of the CPU 801. The SSD 804 stores various items of data of programs and the like for the IWB. The network I/F 805 controls communication with the communication network 9. The external device connection I/F 806 is an interface for connecting various external devices. In this case, the external device is, for example, a USB memory 830 and external devices (a microphone 840, a speaker 850, and a camera 860).

Also, the IWB 800 includes a capturing device 811, a GPU 812, a display controller 813, a touch sensor 814, a sensor controller 815, an electronic pen controller 816, a short-distance communication circuit 819, an antenna 819a for the short-distance communication circuit 819, a power switch 822, and selection switches 823.

Among these, the capturing device 811 causes a display of the external PC 870 to display video information as a still image or moving images. The GPU (Graphics Processing Unit) 812 is a semiconductor chip dedicated to perform graphic operations. The display controller 813 controls and manages screen displaying to output an output image from the GPU 812 to a display 880 or the like.

The touch sensor 814 detects that the electronic pen 890, a hand H of the user, or the like has come into contact with the display 880. The sensor controller 815 controls a process executed by the touch sensor 814. The touch sensor 814 receives coordinates as input by an infrared cut-off method, and detects the coordinates. This method of inputting coordinates and detecting coordinates is a method in which two light reception/emission devices disposed at both ends on the upper side of the display 880, emit multiple infrared rays parallel to the display 880, and receive the light that is reflected by a reflecting member disposed around the display 880, and comes back through the same light path as the light emitted by light reception elements has gone through.

The touch sensor 814 outputs IDs of the infrared rays that have been emitted by the two light reception/emission devices, and cut off by an object, to the sensor controller 815, and the sensor controller 815 identifies a coordinate position which is a contact position of the object. The electronic pen controller 816 communicates with the electronic pen 890, to determine whether there is a touch by the pen point or a touch by the pen tail on the display 880. The short-distance communication circuit 819 is a communication circuit of NFC, Bluetooth, or the like. The power switch 822 is a switch for switching between on and off of the power of the IWB 800. The selection switches 823 are a group of switches for adjusting, for example, the brightness or darkness, tone of color, and the like of the display 880.

Further, the IWB 800 includes a bus line 810. The bus line 810 includes an address bus, a data bus, and the like for electrically connecting components including the CPU 801 illustrated in FIG. 6.

Note that the touch sensor 814 is not limited to such an infrared cut-off method, and various detectors may be used including a touch panel of an electrostatic capacitance type that identifies a contact position by detecting a change of the electrostatic capacitance; a touch panel of a resistance film method to identify a contact position by a voltage change of two resistor films facing each other; and a touch panel of an electromagnetic induction type to identify a contact position by detecting electromagnetic induction generated by a contact object contacting a display unit. Also, the electronic pen controller 816 may determine whether there is a touch by a user-held part of the electronic pen 890 or by any other part of the electronic pen, not only by the pen point and the pen tail of the electronic pen 890.

<Functional Configuration>

Figure 7:
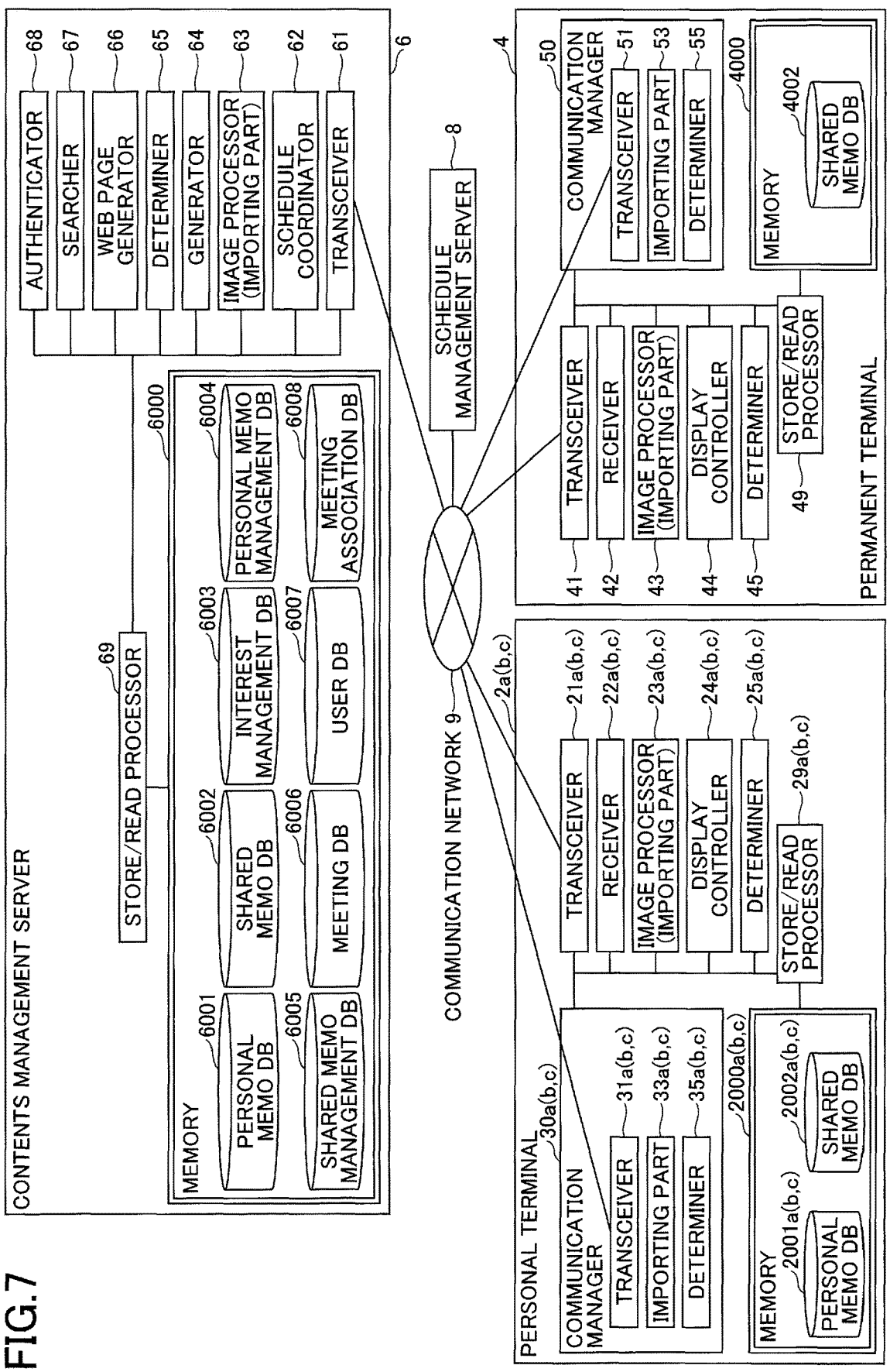
FIG. 7 is a functional block diagram of terminals and servers constituting an information sharing system.

With reference to FIG. 7, a functional configuration of terminals and servers constituting the information sharing system will be described. FIG. 7 is a functional block diagram of the terminals and the server constituting an information sharing system.

<<Functional Configuration of Personal Terminal>>

First, a functional configuration of the personal terminal 2a will be described. As illustrated in FIG. 7, the personal terminal 2a includes a transceiver 21a, a receiver 22a, an image processor 23a, a display controller 24a, a determiner 25a, a store/read processor 29a, and a communication manager 30a. These units are functions or functional units implemented by one or more of the elements illustrated in FIG. 3, operating under instructions from the CPU 501 according to a program loaded in the RAM 503 from the HD 504. Also, the personal terminal 2a includes a memory 2000a constituted with the RAM 503 and the HD 504 illustrated in FIG. 3.

Note that the transceiver 21a, the receiver 22a, the image processor 23a, the display controller 24a, the determiner 25a, and the store/read processor 29a are implemented by (a web application of) a web browser that displays a screen of a personal board, which will be described later. The communication manager 30a is implemented by a dedicated communication application.

(Functional Elements)

Next, each of the functional elements of the personal terminals 2a will be described in detail. The transceiver 21a transmits and receives various items of data (or information) to and from the other terminals, devices, or servers through the communication network 9. For example, the transceiver 21a receives data of contents described in HTML, CSS (Cascade Style Sheet), and JavaScript (registered trademark)' from the contents management server 6. Also, the transceiver 21a transmits operational information input by the user to the contents management server 6.

The receiver 22a receives various inputs from the keyboard 511 and the pointing device 512 operated by the user. The image processor 23a performs a process of, for example, generating vector data (or stroke data) in response to a drawing operation performed by the user. Also, the image processor 23a has functions as an importing part, for example, to capture an image on the shared screen ss, to import the captured image.

The display controller 24a causes the display 506 to display a personal board screen or a common use board screen, which will be described later. The determiner 25a makes various determinations. The store/read processor 29a is executed by instructions from the CPU 501 and by the HDD controller 505, the media I/F 516, and the DVD-RW drive 514, and performs processing for storing various items of data in the memory 2000a, the DVD-RW 513, and the recording medium 515, and for reading various items of data from the memory 2000a, the DVD-RW 513, and the recording medium 515.

The communication manager 30a is implemented mainly by instructions from the CPU 501 illustrated in FIG. 3, and performs inputting and outputting data with the transceiver 21a or the like. The communication manager 30a further includes a transceiver 31a, an importing part 33a, and a determiner 35a.

Among these, the transceiver 31a transmits and receives various items of data (or information) to and from the contents management server 6 through the communication network 9 independently from the transceiver 21a. Basically, the importing part 33a has substantially the same functions as the importing part function of the image processor 23a. For example, the importing part 33a imports the captured image by performing screen capturing of the shared screen ss, which will be described later. The determiner 35a makes various determinations, for example, determines whether a captured image is referenced by the user. Note that the functional configurations of the personal terminals 2b and 2c are substantially the same as the functional configuration of the personal terminal 2a. Therefore, the description is omitted.

<<Functional Configuration of Permanent Terminal>>

Next, a functional configuration of the permanent terminal 4 will be described. As illustrated in FIG. 7, the permanent terminal 4 includes a transceiver 41, a receiver 42, an image processor 43, a display controller 44, a determiner 45, a store/read processor 49, and a communication manager 50. These units are functions or functional units implemented by one or more of the elements illustrated in FIG. 5, operating under instructions from the CPU 701 according to a program loaded in the RAM 702 from the recording medium 706.

Note that these units may be functions or functional units implemented by one or more of the elements illustrated in FIG. 5, operating under instructions from the CPU of the stick PC 730 according to a program loaded in the RAM of the stick PC 730. Also, the permanent terminal 4 includes a memory 4000 constituted with the RAM 703 illustrated in FIG. 5 or the like. A shared memo DB 4002 is constructed in the memory 4000 of the permanent terminal 4.

Note that the transceiver 41, the receiver 42, the image processor 43, the display controller 44, the determiner 45, the store/read processor 49, the communication manager 50, and the memory 4000 in the permanent terminal 4 are substantially the same as the transceiver 21a, the receiver 22a, the image processor 23a, the display controller 24a, the determiner 25a, the store/read processor 29a, the communication manager 30, and the memory 2000a in the personal terminal 2a, respectively. Therefore, the description is omitted. Further, although the communication manager 50 in the permanent terminal 4 includes a transceiver 51, an importing part 53, and a determiner 55, the functions of these are substantially the same as the functions of the transceiver 31a, the importing part 33a, and the determiner 35a, respectively. Therefore, the description is omitted.

Note that the transceiver 41, the receiver 42, the image processor 43, the display controller 44, the determiner 45, and the store/read processor 49 are implemented by (a web application of) a web browser that displays a screen of the common use board. The communication manager 50 is implemented by a dedicated communication application.

<<Functional Configuration of Content Management Server>>

Next, a functional configuration of the contents management server 6 will be described. As illustrated in FIG. 7, the contents management server 6 includes a transceiver 61, a schedule coordinator 62, an image processor 63, a generator 64, a determiner 65, a web page generator 66, a searcher 67, an authenticator 68, and a store/read processor 69. These units are functions or functional units implemented by one or more of the elements illustrated in FIG. 3, operating under instructions from the CPU 501 according to a program loaded in the RAM 503 from the HD 504. Also, the contents management server 6 includes a memory 6000 constituted with the RAM 503 and the HD 504 illustrated in FIG. 3.

(Functional Elements)

Next, each of the functional elements of the contents management server 6 will be described in detail. The transceiver 61 transmits and receives various items of data (or information) to and from the other terminals, devices, or servers through the communication network 9. The schedule coordinator 62 obtains schedule information including bibliographic information on meetings and the like attended by the users from the schedule management server 8 connected with the communication network 9 to be capable of transmitting and receiving various items of data (or information). The schedule management server 8 stores schedule information (meeting (list) information) for each user (for each user ID).

The bibliographic information included in the schedule information includes information on dates and times, start and end times, meeting names, locations, planned attendees, and registrants of schedules (meetings). The contents management server 6 can have the bibliographic information on the obtained schedule information registered as the bibliographic information on the meetings of the shared memo management DB 6005. In particular, in the case where a user generates a new meeting on the contents management server 6 based on a previously obtained schedule, a registrant of the schedule included in the bibliographic information on the schedule is set as the meeting organizer, and the role of the organizer is assigned to the user ID of the registrant to be registered.

The image processor 63 has functions as an importing part, to import the captured image by performing screen capturing of the shared screen ss, which will be described later. The generator 64 generates a content ID, personal memo ID, shared memo ID, and the like that are unique. The determiner 65 determines whether or not the content ID, the personal memo ID, the shared memo ID, and the like have been received by the transceiver 61.

The web page generator 66 generates data of a web page to be displayed by the web browsers of the personal terminal 2 and the permanent terminal 4. The searcher 67 receives a search request from a personal portal screen, which will be described later, displayed by the web browser of the personal terminal 2 and the permanent terminal 4, to perform a search according to the search request. Also, the authenticator 68 authenticates the user. Note that the authenticator 68 may be included in a device other than the contents management server 6, for example, and an authentication server connected to the communication network 9 may be used.

The store/read processor 69 is executed by instructions from the CPU 501 and by the HDD controller 505, the media I/F 516, and the DVD-RW drive 514, and performs processing for storing various items of data in the memory 6000, the DVD-RW 513, and the recording medium 515, and for reading various items of data from the memory 6000, the DVD-RW 513, and the recording medium 515.

Also, in the memory 6000 of the contents management server 6, the personal memo DB 6001, a shared memo DB 6002, an interest management DB 6003, a personal memo management DB 6004, a shared memo management DB 6005, a meeting DB 6006, a user DB 6007, and an meeting association DB 6008 are constructed.

Note that these data items may be stored in a separate server other than the contents management server 6. In this case, as the timing of data obtainment and transmission, it is possible to obtain data from the separate server each time a request is made from the personal terminal 2 to obtain and transmit data, or during a meeting or as long as the users refer to the personal boards dc and the common use board cc, the data is stored in the contents management server 6, and after the meeting and reference (or after a certain period of time) have been completed, the data may be deleted from the contents management server 6 and transmitted to the separate server.

Note that each of the devices described in the present embodiment merely represents one of multiple computing environments for carrying out an embodiment disclosed in the present description. In a certain embodiment, the contents management server 6 may include multiple computing devices such as a server cluster. Multiple computing devices may be configured to communicate with each other via any type of communication links, including networks, shared memories, and the like, to carry out the processes disclosed in the present description. Similarly, the personal terminal 2 and the permanent terminal 4 may include multiple computing devices configured to communicate with each other.

Figure 23:
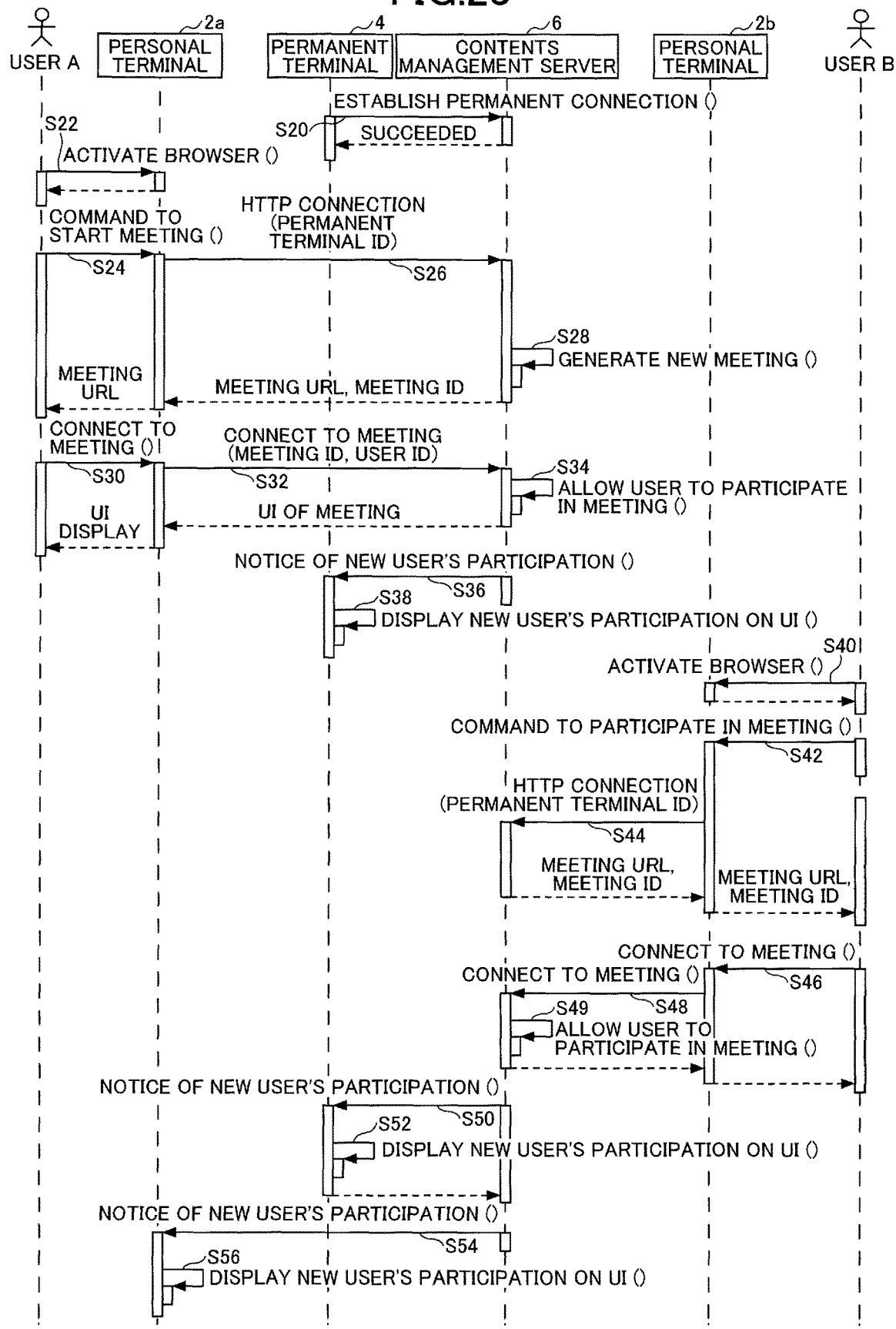
FIG. 23 is a sequence chart of an example of a process starting from meeting preparation until a personal board screen is displayed.
Figure 26:
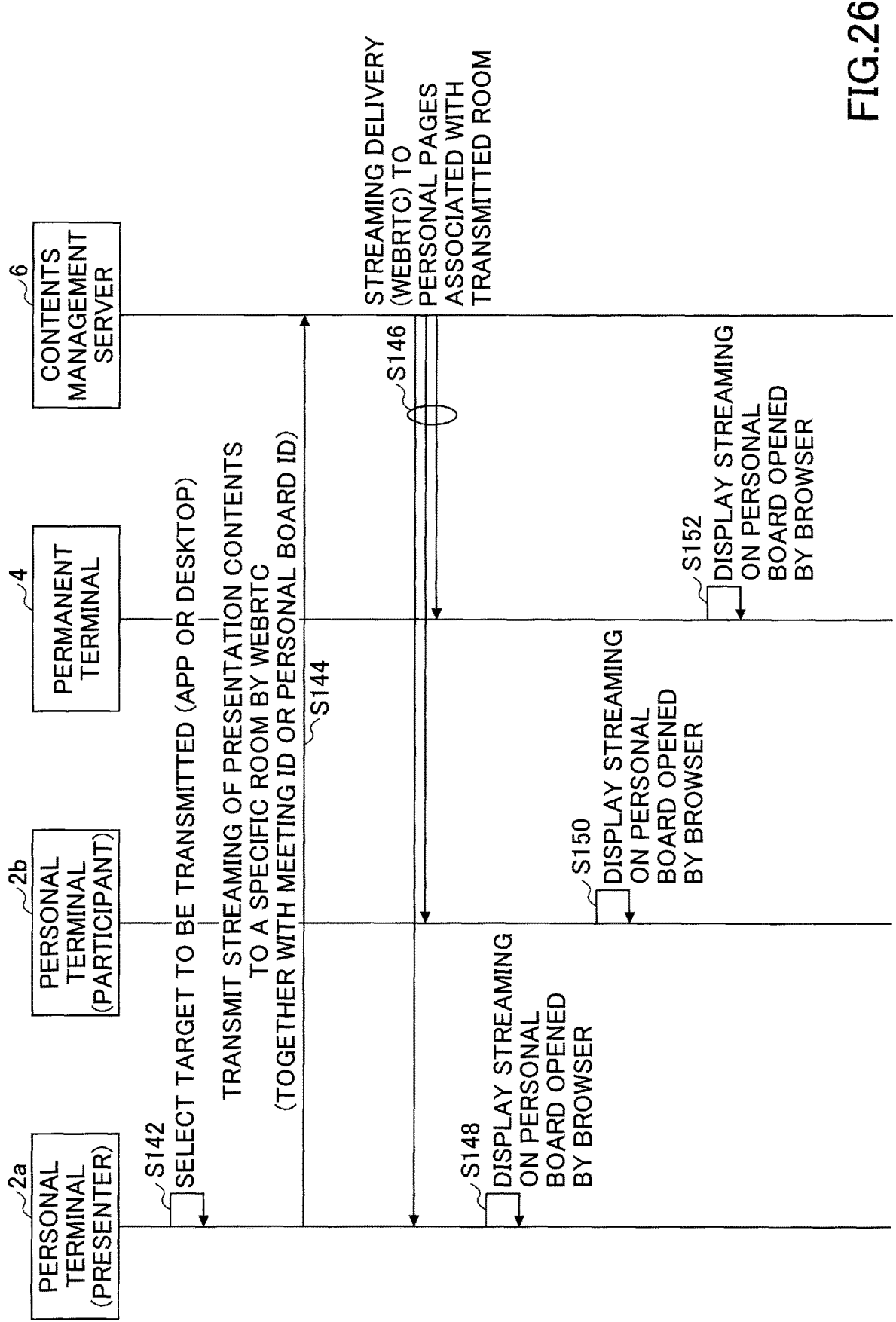
FIG. 26 is a sequence chart of an example illustrating a process until a projection screen is displayed on a personal board screen.
Figure 28:
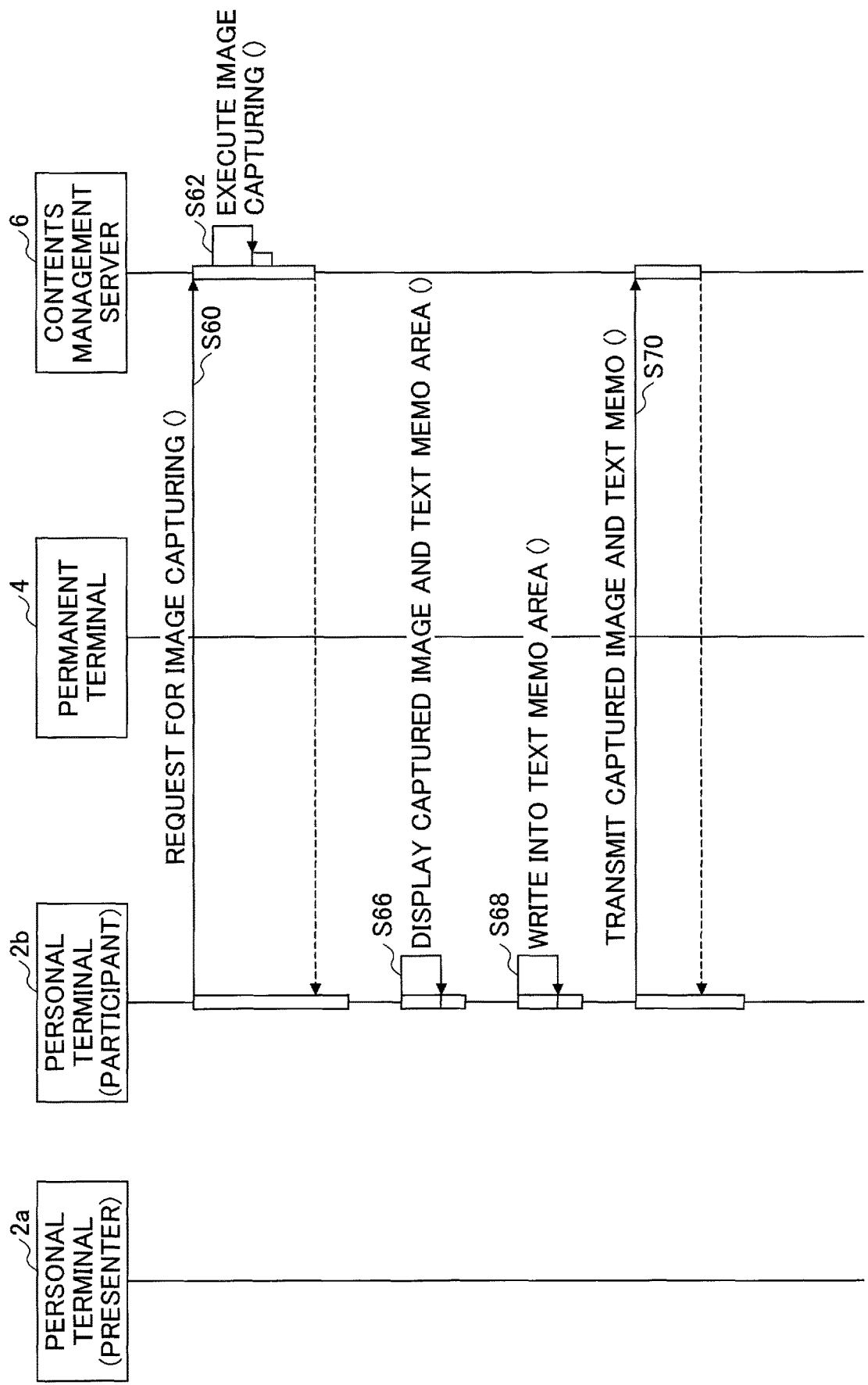
FIG. 28 is a sequence chart of an example of a process of taking in a captured image of a projection screen and writing a note into the captured image and a text memo area.

Furthermore, the contents management server 6, the personal terminal 2, and the permanent terminal 4 may be configured to share the disclosed processing steps, such as FIGS. 23, 26, and 28, in various combinations. For example, part of the processes executed by the contents management server 6 may be executed by the personal terminal 2 and the permanent terminal 4. Also, the elements of the contents management server 6, the personal terminal 2, and the permanent terminal 4 may be integrated into one device or divided into multiple devices. The present information sharing system may also be used in meeting rooms, seminar venues, business negotiation spaces, and the like where a permanent terminal 4 is not installed. In such cases, the permanent terminal 4 is not an indispensable element, and the system may be configured to include a contents management server 6 and multiple personal terminals 2.

<Examples of Displays on Personal Board Screen>

With reference to FIGS. 8 to 11, examples of displays on a personal board screen 1000 until the end of a meeting will be described. The personal board screen 1000 is a screen for displaying information to be presented to a user or for receiving operations from the user through a GUI (Graphical User Interface), and is a display form of a web browser or application software.

As illustrated in FIGS. 8 to 11, on the personal board screen 1000 until the end of the meeting, a projection area to display a projection screen is displayed on the left, and a memo area is displayed on the right. In the projection area, a shared screen ss is displayed as the projection screen. In the memo area, each pair of a captured image 1022 of the projection screen and a text memo area 1024 accompanying the captured image 1022 is displayed on a sheet 1020.

By performing a pressing operation on a capture button 1016, the user can capture an image of the projection screen displayed on the projection area, to additionally display a sheet 1020 displaying a pair of a captured image 1022 and a text memo area 1024 in the memo area. Note that the pressing operation on the capture button 1016 is merely an example, and may be, for example, a press operation on a shortcut key of the keyboard or a gesture operation on the touch panel.

FIG. 8 is an image diagram of an example of a display on a projection screen and a personal board screen 1000 before the first screen capturing is performed. For example, on the personal board screen 1000 in FIG. 8, a guide message "A projection screen is displayed here" is displayed in the projection area. Also, in the memo area in FIG. 8, a guide message "A captured image is displayed" is displayed as a captured image 1022. By displaying such guide messages, the user can imagine a screen image after screen capturing will have been performed before the first screen capturing is performed on the personal board screen illustrated in FIG. 8. Note that the guide messages may not be displayed. Also, reception of a user input in the text memo area 1024 may be allowed even before the first screen capturing is performed.

Figure 9C:
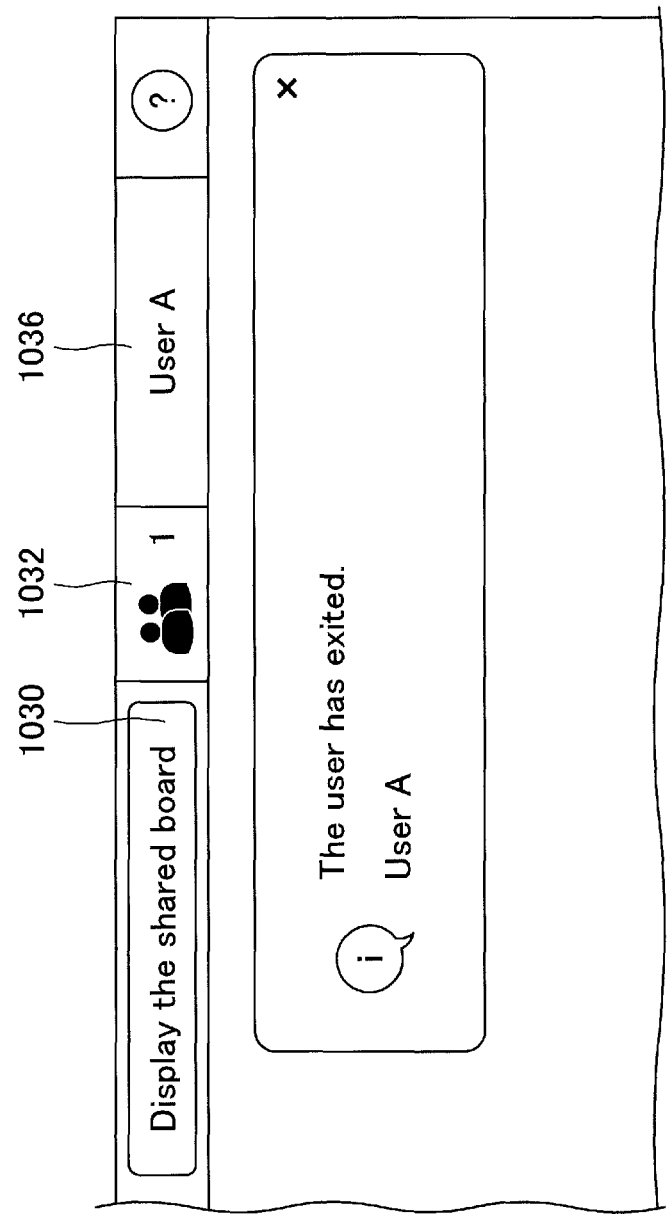

The user can participate in (log into) a room and exit the room through the personal board screen 1000 in FIG. 8. Participation in the room and exit from the room change the display on the upper right part of the personal board screen 1000, for example, as illustrated in FIGS. 9A to 9C. FIGS. 9A to 9C are image diagrams of an example illustrating changes in a personal board screen 1000 caused by participation into a room and exit out of the room of the user.

FIG. 9A illustrates a display on the upper right part of the personal board screen 1000 immediately after a user A participated in the room. The user A presses a login button 1034 to perform a participation operation to participate in the room (e.g., inputting a user ID, a password, etc.).

The participation of user A causes the user name of the user A who participated in the room to be displayed in a popup window. A field 1032 for displaying the number of participant in the room displays the number of users participating in the room. The number of people displayed in the field 1032 for displaying the number of participant in the room has been increased to two by the participation of the user A.

In FIG. 9B, the participation of the user A in the room has changed the login button 1034 into a username display field 1036. In FIG. 9B, the user A is displayed in the username display field 1036. In FIG. 9B, a list of users participating in the room may be displayed by pointing to or clicking on the field 1032 for displaying the number of participant in the room.

FIG. 9C illustrates a display on the upper right part of the personal board screen 1000 immediately after the user A has exited the room. An exit operation performed by the user A when exiting the room causes the user name of the user A who exited the room to be displayed in a popup window on the personal board screen 1000. The number of people displayed in the field 1032 for displaying the number of participant in the room decreased to one due to the exit of the user A.

An exit operation performed when exiting the room may be an operation of, for example, clicking the username display field 1036 of the user, and then, selecting exit from the room. Also, an exit operation performed when exiting the room may be an operation of, for example, pressing the home button at the upper left of the personal board screen 1000, to transition to the personal portal screen 5000.

Note that the following situations in which the session with the contents management server 6 is disconnected (bidirectional communication between the personal board dc and the web browser is disconnected) are treated as exits of the users from the room; for example, transition to a different URL such as another site; closure of a tab displayed by the web browser; power off of the personal terminal 2; shut down of the personal terminal 2; transition to a sleep mode in the personal terminal 2; and the like.

When data of contents such as stream data is transmitted to the shared screen ss, the personal board screen 1000 in FIG. 8 turns into a personal board screen 1000 as illustrated in FIG. 10. FIG. 10 is an image diagram of an example of the personal board screen 1000 on which a projection screen 1040 is displayed. In the projection area in FIG. 10, a screen of contents such as the stream data transmitted to the shared screen ss is displayed as the projection screen 1040.

Figure 11:
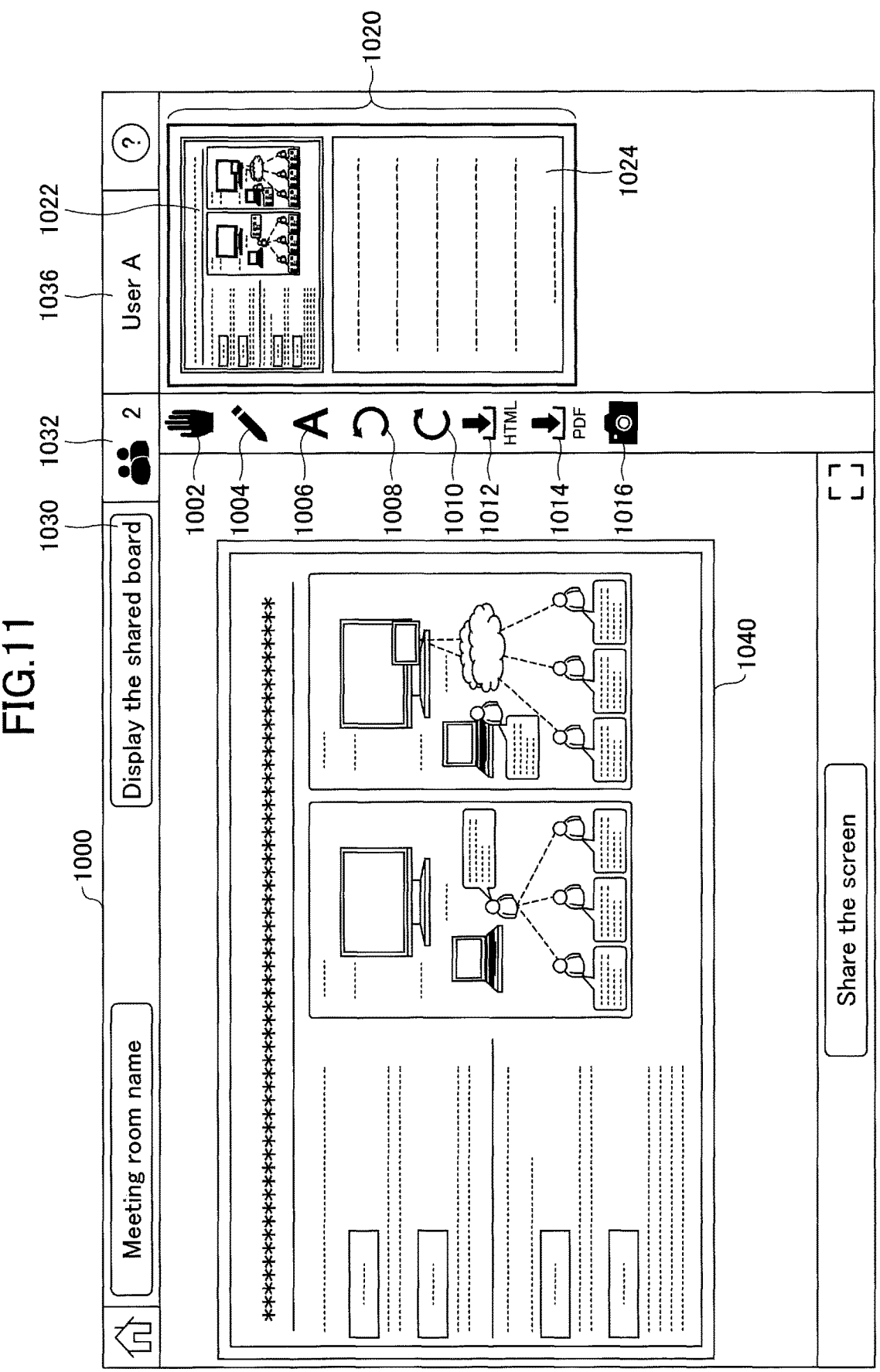
FIG. 11 is an image diagram of an example of a personal board screen after the first screen capturing has been performed.

In response to receiving an operation of pressing the capture button 1016 from the user, the personal board screen 1000 in FIG. 10 turns into a personal board screen 1000 in FIG. 11. FIG. 11 is an image diagram of an example of the personal board screen 1000 after the first screen capturing has been performed. For example, the personal board screen 1000 in FIG. 11 is an example of a UI that displays the shared screen ss and the personal board dc in a single screen. Note that the personal board screen 1000 may be a UI for switching the display between the shared screen ss and the personal board dc by switching tabs.

By performing a pressing operation on the capture button 1016, the user can capture the image of the projection screen 1040 at that time, to display the captured image 1022 of the projection screen 1040 in a memo area. Also, the user may display a text memo area 1024 accompanying the captured image 1022 in the memo area. The captured image 1022 and the text memo area 1024 accompanying the captured image 1022 are displayed, for example, on a single sheet 1020. This enables to display the combination of the captured image 1022 and the text memo area 1024 in an easily understandable way. Note that in the case where an operation of pressing the capture button 1016 is received from the user, the projection screen 1040 at that time may be compared with the captured image 1022 of the projection screen 1040 that has been imaged and displayed in the memo area, so as not to capture an image having the same contents.

Also, the mouse cursor is moved to be aligned with the first line of the newly displayed text memo area 1024 in response to an operation of pressing the capture button 1016 by the user. Therefore, the user can easily switch from a press operation on the capture button 1016 to an operation in the text memo area 1024. Note that input operations by the user in the text memo area extends the text memo area 1024 downward finitely or infinitely.

Also, an object may also be drawn in the captured image 1022 by using a pen tool or the like. On the personal board screen 1000, a tool palette is displayed in which a hand tool button 1002, a pen tool button 1004, a text tool button 1006, an undo button 1008, a redo button 1010, an HTML save button 1012, a PDF save button 1014, and a capture button 1016 are displayed.

The hand tool button 1002 is a button for the user to start using a hand tool. Using the hand tool allows the user to select an object drawn in a captured image 1022 and to move the object by drag-and-drop. The pen tool button 1004 is a button for the user to start using a pen tool. Using the pen tool allows the user to select a color and/or a line thickness to draw an object in the captured image 1022.

The text tool button 1006 is a button for the user to start using a text tool. Using the text tool allows the user to generate a text area on the captured image 1022 and to input text. The undo button 1008 is a button to undo an operation already performed. The redo button 1010 is a button for proceeding with the operation undid by the undo button 1008.

The HTML save button 1012 is a button for locally saving information on the personal board screen 1000 in an HTML file. The PDF save button 1014 is a button for locally saving a captured image 1022 and a text memo area 1024 displayed in the memo area of the personal board screen 1000 in a PDF file. The capture button 1016 is a button for capturing an image of the projection screen 1040 displayed on the projection area, to additionally display a sheet 1020 displaying a combination of the captured image 1022 and the text memo area 1024 in the memo area.

Note that an object drawn in the captured image 1022 may be deleted by using the delete key or the backspace key. Also, the sheet 1020 may also be deleted by using the delete key or the backspace key.

During editing work including drawing an object in the captured image 1022 and inputting a text note into the text memo area 1024, the projection area may be reduced to expand the memo area to make the editing work easier. The reduction of the projection area and the expansion of the memo area may be done automatically by a web application or an operation performed by the user to move the tool palette to the left.

Figure 13:
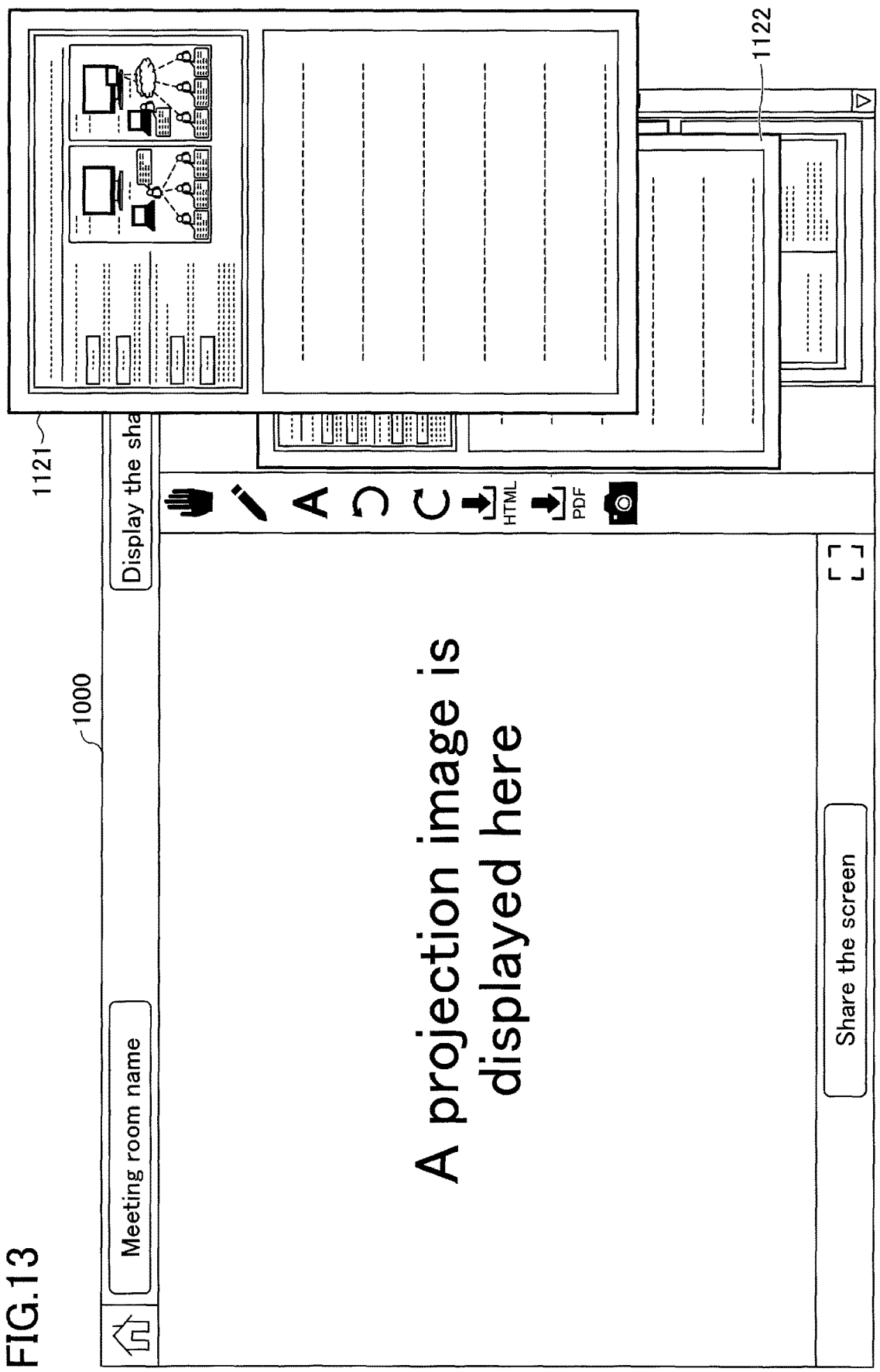
FIG. 13 is an image diagram of an example of a personal board screen for receiving editing commands of a sheet from a user during a meeting.

Further, as illustrated in FIG. 13, on the personal board screen 1000 during a meeting, a sheet 1020 selected by the user in the memo area may be displayed as an enlarged sheet 1122, or may be displayed in a separate window 1121. FIG.

13 is an image diagram of an example of the personal board screen 1000 for receiving editing commands of a sheet from a user during a meeting.

Also, the sheet 1020 in which the captured image 1022 or the text memo area 1024 is being edited may be framed by, for example, enclosing lines so as to be visually distinguishable, or the color of the sheet 1020 may be changed.

Note that the memo area is not limited to be on the right side of the personal board screen 1000, but may displayed on the left side or may displayed on the lower side. By performing a pressing operation on the capture button 1016, the user can capture an image of the projection screen 1040 displayed on the projection area, to additionally display a sheet 1020 displaying a combination of the captured image 1022 and the text memo area 1024 in the memo area.

Also, in response to receiving multiple pressing operations on the capture button 1016 from the user, the personal board screen 1000 displays multiple sheets 1020 in the memo area. Each time the user performs a press operation on the capture button 1016, in the personal board screen 1000, a sheet 1020 is additionally displayed with the other sheets arranged vertically in the memo area.

Next, with reference to FIG. 12, examples of displays on a personal board screen 1100 after a meeting will be described. The personal board screen 1100 is a screen for displaying information to be presented to the user or for receiving operations from the user through a GUI, and is a display form of a web browser or application software.

Figure 12:
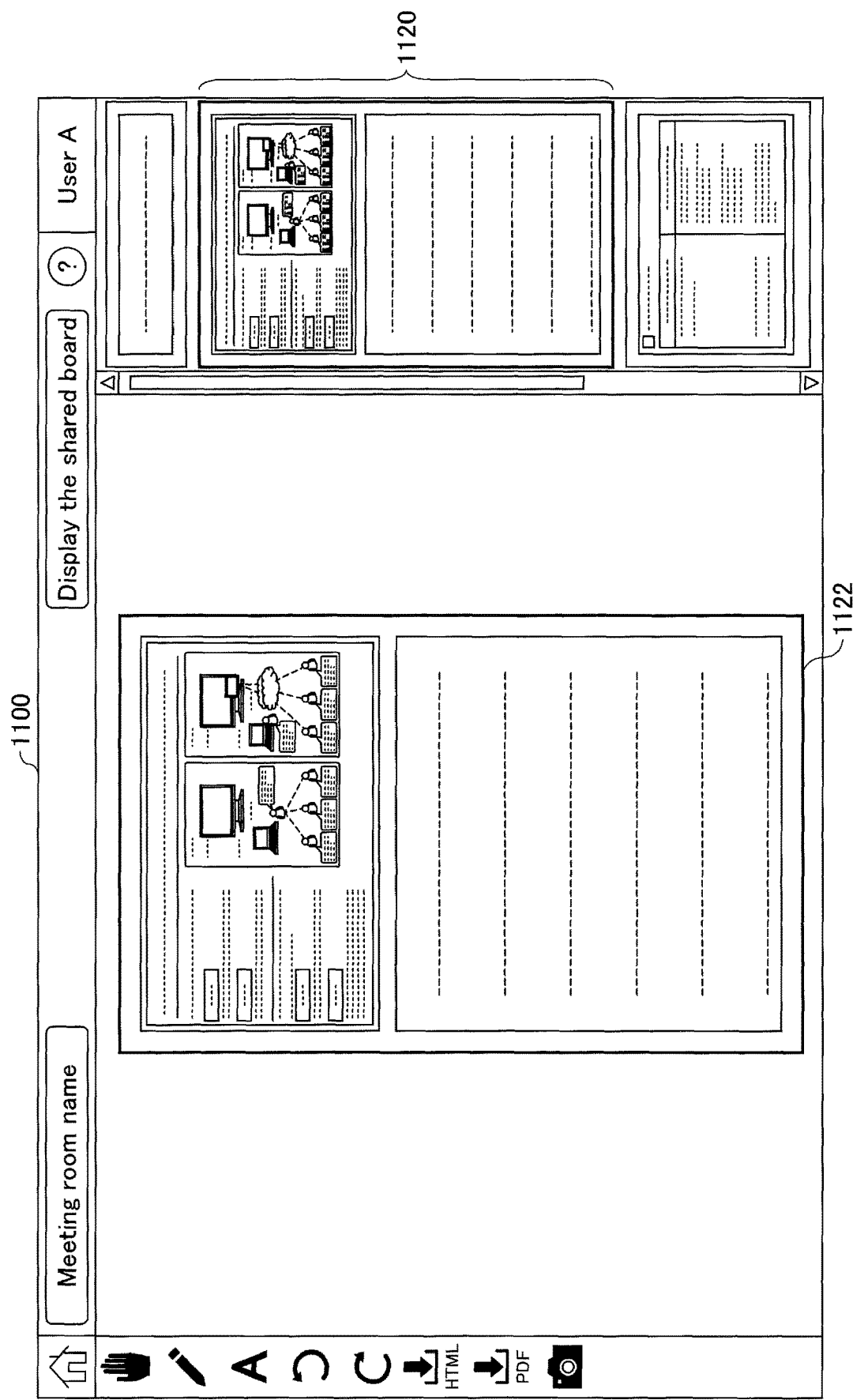
FIG. 12 is an image diagram of an example of a personal board screen after a meeting has been ended.

FIG. 12 is an image diagram of an example of the personal board screen 1100 after a meeting has been ended. In the personal board screen 1100 after a meeting illustrated in FIG. 12, a memo area similar to the personal board screen 1000 is displayed on the right side, and an enlarged sheet area is displayed on the left side. In the enlarged sheet area, an enlarged sheet 1122 of a sheet 1120 selected by the user in the memo area is displayed. As in the midst of the meeting, on the enlarged sheet 1122, it is possible for the user to perform editing such as drawing an object into the captured image 1022, inputting a text note into the text memo area 1024, and the like.

A list of all sheets 1120 is displayed vertically in the memo area of the personal board screen 1100. The user can scroll up and down the memo area. The user can display a sheet 1120 selected in the memo area as the enlarged sheet 1122 in the enlarged sheet area on the left.

Note that as will be described later, the personal terminal 2 that displays the personal board screen 1100 transmits information on s sheet 1120 selected by the user in the memo area, and information on the sheet 1120 displayed for a certain period of time or longer as the enlarged sheet 1122, to the contents management server 6 to record the reference count of the sheet 1120. Also, consideration may be taken for the reference count of the first sheet 1120, which tends to be displayed more often than the others due the arrangement, so as not to be overcounted.

Also, for example, at a timing when receiving a click operation on a sheet other than the currently selected sheet 1120 or the enlarged sheet 1122, the personal terminal 2 may transmit to the contents management server 6 the contents edited on the sheet 1120 or the enlarged sheet 1122. Furthermore, the display of the memo area in FIG. 12 or the like is merely an example; instead of the sheet 1120, for example, a reference number or a summarized text of the sheet 1120 may be displayed.

<DB Configuration>
<<Personal Memo Management DB>>

FIG. 14 is a configuration diagram of an example of the personal memo management DB 6004. In the memory 6000 of the contents management server 6, the personal memo management DB 6004 as illustrated in FIG. 14 is constructed. The personal memo management DB 6004 in FIG. 14 manages items of personal memo ID, user ID, room ID, sheet ID, and captured image in association with each other. The item "personal memo ID" is an example of personal memo identification information that identifies the personal memo dm of a personal board dc. The item "user ID" is an example of user identification information that identifies the user. The item "meeting ID" is an example of meeting identification information that identifies a meeting that is held in the room. The item "sheet ID" is an example of sheet identification information that identifies a sheet 1020 or 1120. The item "captured image" is an example of image file identification information that identifies an image file in which an image of the projection screen 1040 has been captured.

Once the user ID of the user who is operating the personal terminal 2 is identified by the personal memo management DB 6004 in FIG. 14, the meeting ID and the personal memo ID of each meeting held in the room in which the user participated can be identified. Also, the personal memo management DB 6004 in FIG. 14 enables to identify, for example, a sheet 1020 that is displayed on the personal board screen 1000 identified from the personal memo ID, and an image file of the captured image 1022 that is displayed on the sheet 1020.

<<Shared Memo Management DB>>

FIG. 15 is a configuration diagram of an example of the shared memo management DB 6005. In the memory 6000 of the contents management server 6, the shared memo management DB 6005 as illustrated in FIG. 15 is constructed. The shared memo management DB 6005 in FIG. 15 manages items of shared memo ID, meeting ID, and bibliographic information on a meeting in association with each other.

The item "shared memo ID" is an example of shared memo identification information that identifies a shared memo cm of the common use board cc. The item "meeting ID" is an example of meeting identification information that identifies a meeting that is held in the room. The item "bibliographic information on a meeting" is bibliographic information on a meeting identified by a meeting ID. Once a meeting ID is identified in the shared memo management DB 6005 in FIG. 15, the meeting bibliographic information can be identified.

<<Personal Memo DB>>

FIG. 16 is a configuration diagram of an example of the personal memo DB 2001a. In the memory 2000a of the personal terminal 2a, the personal memo DB 2001a as illustrated in FIG. 16 is constructed. The personal memo DB 2001a exists only while the web browser is activated because it is generated in the cache of the web browser.

Data managed in the personal memo DB 2001a is the same as data of each personal terminal 2 managed in the personal memo DB 6001 in the contents management server 6. The personal terminal 2a obtains data for the personal terminal 2a among data of the personal terminals 2 managed in the contents management server 6, to manage the data in the personal memo DB 2001a. The personal memo DB 2001a illustrated in FIG. 16 manages items personal memo ID, sheet ID, content ID, data of contents, and display position in association with each other.

The item "personal memo ID" is an example of personal memo identification information that identifies the personal memo dm of a personal board dc. The item "sheet ID" is an example of sheet identification information that identifies a sheet 1020 or 1120. The item "content ID" is an example of content identification information that identifies each content, such as a text memo and/or a drawn object input on the sheets 1020 and 1120.

The item "data of contents" is data such as a text memo and/or a drawn object input on the sheets 1020 and 1120. For example, the data of contents of a content ID "c101" shows an example in which the type is "text memo" input in the text memo area 1024 or the like, the font type is "Mincho", the size is "20", and the input text string is "aiuoe".

Also, the data of contents of a content ID "c103" shows an example in which the type is vector data drawn on a captured image 1022 or the like, and the vector data is represented by numerical data. Note that in the case of a text input into a captured image 1022 or the like by using the text tool, for example, by representing the type of data of contents with "text" or the like, the text input into a captured image 1022 or the like can be distinguished from a text memo input into the text memo area 1024 or the like.

The item "display position" represents a display position of a text memo or a drawn object input on the sheets 1020 and 1120. For example, the display position of a content input into a captured image 1022 or the like is represented by, for example, coordinates. Also, the position of a text memo input into a text memo area 1024 or the like is represented by, for example, the number of lines and the number of characters.

The personal memo DB 6001 has substantially the same data structure as the personal memo DB 2001*a*. Therefore, the description is omitted. However, the personal memo DB 6001 includes all data of the personal memo DBs 2001*a*, 2001*b*, and 2001*c*.

<<Shared Memo DB>>

FIG. 17 is a configuration diagram of an example of the shared memo DB 2002*a*. In the memory 2000*a* of the personal terminal 2*a*, A shared memo DB 2002*a* as illustrated in FIG. 17 is constructed. The shared memo DB 2002*a* exists only while a web browser is activated because it is generated in the cache of the web browser. Note that the shared memo DB 6002 has substantially the same data structure as the shared memo DB 2002*a*. Therefore, the description is omitted.

Data managed in the shared memo DB 2002*a* is the same as the data managed in the shared memo DB 6002 in the contents management server 6. The personal terminal 2*a* obtains data managed in the shared memo DB 6002 of the contents management server 6, to manage the data in the shared memo DB 2002*a*.

In the shared memo DB 2002*a*, in association with a shared memo ID to identify a shared memo on the common use board cc, a tuple of a content ID, data of contents, a display position of the data of contents is managed.

The item "content ID" is an example of content identification information for identifying each content. The item "data of contents" is the data of contents such as a text input on the common use board cc, a pasted image, vector data obtained by drawing, and the like. The item "display position" represents a display position of the content on the shared board.

<<Interest Management DB>>

FIG. 18 is a configuration diagram of an example of the interest management DB 6003. In the memory 6000 of the contents management server 6, the interest management DB 6003 as illustrated in FIG. 18 is constructed. The interest management DB 6003 in FIG. 18 manages items of personal memo ID, capturing count of streaming, reference count of capturing, write count, DL as PDF, meeting participation time, and meeting exit time in association with each other.

The item "personal memo ID" is an example of personal memo identification information that identifies the personal memo dm of a personal board dc. The item "capturing count of streaming" represents the number of times the user has captured images of the projection screen 1040 on the personal board screen 1000 of a meeting identified by the personal memo ID.

The item "reference count of capturing" represents the reference count with respect to all capturings, and the reference count and reference time with respect to each capturing on the personal board screen 1100 of a meeting identified by the personal memo ID after the meeting, as an example of a referenced count of a sheet 1120 referenced by the user.

The reference count and reference time with respect to each capturing represent the number of times and date and time, respectively, for each sheet 1120 referenced by the user on the personal board screen 1100 of a meeting identified by the personal memo ID. The reference count with respect to all capturings is the total number of times for each sheet 1120 referenced by the user.

The item "write count" represents a write count written on the sheet 1020 or 1120 by the user on the personal board screen 1000 or 1100 of a meeting identified by the personal memo ID. In the interest management DB 6003 in FIG. 18, as examples of the write count, the number of characters in all texts for each personal memo, the number of characters in texts for each capturing for each personal memo, the number of handwritten objects (lines, stamps, etc.), the number of handwritten objects for each capturing for each personal memo, and the number of handwritten characters for each capturing are illustrated.

The number of characters in all texts for each personal memo is the total number of characters in texts obtained by adding up the number of characters in each text memo area 1024, such as in a sheet 1020. The number of characters in texts for each capturing for each personal memo is the number of characters in texts for each text memo area 1024, such as in a sheet 1020.

The number of handwritten objects (lines, stamps, and the like) is the total number of objects obtained by adding up the number of handwritten objects for each captured image 1022, such as in a sheet 1020. The number of handwritten objects for each capture in a personal memo is the number of handwritten objects for each captured image 1022, such as in a sheet 1020. The number of handwritten characters for each capturing is the total number of characters obtained by adding up the number of handwritten characters for each captured image 1022, such as in a sheet 1020.

The item "DL as PDF" represents whether or not the captured image 1022 and the text memo area 1024 displayed in the memo area on the personal board screen 1000 were locally saved (downloaded) as a PDF file, by using the PDF save button 1014 described above.

The item "meeting participation time" represents date and time when the user participated in the room from the personal board screen 1000. The meeting participation times is recorded by the contents management server 6 that registers, as the meeting participation time, a time when accessed from a personal terminal to connect to a meeting at S32, S48, or the like in FIG. 23, or a time when allowing the user to participate in the meeting at S34 or S49, in association with the user ID or the personal memo ID. Note that the meeting participation time may be recorded together with operations executed at S34 or S49.

Also, the item "meeting exit time" represents date and time when the user exited the room. The meeting exit time is recorded by the contents management server 6 that registers, as the meeting exit time, a time when accessed from a personal terminal to exit the meeting at S202, S216, or the like in FIG. 29, or a time when the user exited from the meeting at S204 or S206; or alternatively, a time when the contents management server 6 detects disconnection between the personal terminal and the contents management server 6, or disconnection of bidirectional communication between the web browser of the personal terminal and the personal board of the contents management server 6, in association with the user ID or the personal memo ID. Note that the meeting exit time may be recorded together with operations executed at S204 or S206.

Note that in the case where a participant having the same user ID participates in and exits a meeting multiple times, all of the multiple meeting participation times and meeting exit times may be recorded and displayed; the meeting participation time may be recorded only for the first time, while the meeting exit time is updated for the last time; or only one meeting participation time and one meeting exit time may be recorded and displayed.

<<Meeting Association DB>>

FIG. 19 is a configuration diagram of an example of the meeting association DB 6008. In the memory 6000 of the contents management server 6, the meeting association DB 6008 as illustrated in FIG. 19 is constructed. The meeting association DB 6008 in FIG. 19 manages items of identifier and meeting ID in association with each other.

The item "identifier" may be, for example, an ID of the permanent terminal 4 that identifies the permanent terminal 4, which simply needs to be identification information that is available for a user participating in the same meeting. The requirement of the identifier is to be unique in the contents management server 6.

Therefore, the identifier may be, for example, a MAC address of a LAN or any PIN code, or may be any character string, for example, "apple", "first sales department", or "OO only", as long as it does not conflict with identifiers of the other persons.

The present embodiment does not impose any restrictions on the form or type of identifier. The item "meeting ID" is an example of meeting identification information that identifies a meeting held in the room. Note that the meeting ID is generated again every time when the meeting in the room is ended.

Unless a meeting is in session, the identifier in the meeting association DB 6008 in FIG. 19 is not associated with the meeting ID. Also, while a meeting is in session, the identifier in the meeting association DB 6008 in FIG. 19 is associated with the meeting ID. Therefore, by referring to the meeting association DB 6008 in FIG. 19, the contents management server 6 can determine whether a meeting associated with the identifier is in session.

<<Meeting DB>>

FIG. 20 is a configuration diagram of an example of the meeting DB 6006. In the memory 6000 of the contents management server 6, the meeting DB 6006 as illustrated in FIG. 20 is constructed. The meeting DB 6006 in FIG. 20 manages items of meeting ID, meeting name, meeting room, participating users, and state in association with each other. The item "meeting ID" is an example of meeting identification information that identifies a meeting that is held in the room.

The item "meeting name" is a name of the meeting identified by the meeting ID. The item "meeting room" is an example of identification information representing a location such as a meeting room where the permanent terminal 4 is installed. The item "participating users" represents an array of user IDs of users who participated in the meeting identified by the meeting ID. The item "state" represents a state of the meeting identified by the meeting ID (e.g., the meeting is in session, the meeting has ended, etc.). The meeting DB 6006 in FIG. 20 enables to identify the user ID of a user who participated in the meeting identified by the meeting ID.

<<User DB>>

FIG. 21 is a configuration diagram of an example of the user DB 6007. In the memory 6000 of the contents management server 6, the user DB 6007 as illustrated in FIG. 21 is constructed. The user DB 6007 in FIG. 21 manages items of user ID, user name, and email in association with each other. The item "user ID" is an example of user identification information that identifies a user. The item "user name" is a name of the user identified by the user ID. The item "email" is an email address of the user identified by the user ID.

<Processes or Operations>

Next, processes or operations will be described according to the present embodiment. In the present embodiment, an example will be described in which, in a meeting held in a room, a presenter (user A), as an example of a user who is operating the personal terminal 2a, performs a streaming transmission to the shared screen ss, and a participant (user B), as an example of a user who is operating the personal terminal 2b, participates in the meeting.

Figure 22:
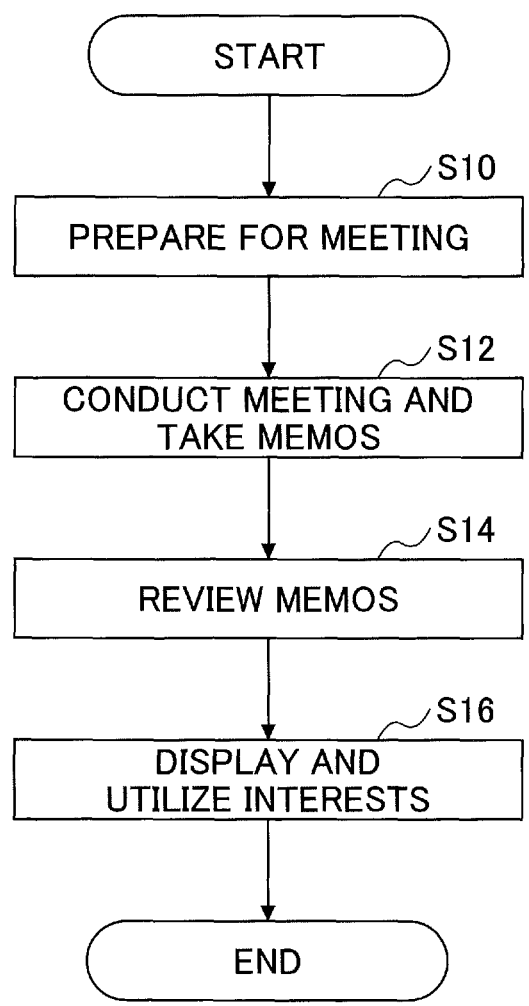
FIG. 22 is a flow chart of an example illustrating a process executed by an information sharing system according to the present embodiment.

FIG. 22 is a flow chart illustrating a process executed by the information sharing system according to the present embodiment. At Step S10, the information sharing system prepares for a meeting. While preparing for the meeting, based on the connection to (participation in) the room from the personal terminal 2a and the personal terminal 2b, a meeting to be held in the room is generated, and the users participate in the meeting. Each of the personal terminal 2a and the personal terminal 2b connected to the room displays a personal board screen 1000 as illustrated in FIG. 8.

At Step S12, the meeting is conducted in the information sharing system. In response to a request from the personal terminal 2 of the presenter, the information sharing system performs a streaming transmission to the shared screen ss of the meeting, to cause each personal terminal 2 to display the projection screen 1040 as illustrated in the personal board screen 1000 in FIG. 10. With reference to the projection screen 1040 displayed on the personal board screen 1000, the participant may perform a pressing operation on the capture button 1016 displayed on the personal board screen 1000 at a timing when he/she wants to capture an image.

Having received the pressing operation on the capture button 1016 by the participant, the personal board screen 1000 imports the captured image 1022 of the projection screen 1040 at that time. Then, for example, as in the memo area of the personal board screen 1000 illustrated in FIG. 11, the captured image 1022 and a text memo area 1024 accompanying the captured image 1022 are displayed on a single sheet 1020.

In this way, the participant can additionally display, at any time, a captured image 1022 of the projection screen 1040 and a text memo area 1024 accompanying the captured image 1022 in the memo area. The participant performs note-writing such as an input of a text note into the text memo area 1024 displayed in the memo area as illustrated in FIG. 11, and drawing an object (inputting a handwritten note) into the captured image 1022 displayed in the memo area. The contents of the DBs described above are updated with the contents of written notes.

At Step S14, the information sharing system causes each personal terminal 2 to display a personal board screen 1100 as illustrated in FIG. 12, so as to allow the participant to browse the personal memo dm in which notes may have been written during the meeting (review of notes), and to review notes written during the meeting. Note that in the personal board screen 1100 as illustrated in FIG. 12, as in the midst of the meeting, it is possible for the user to perform editing such as drawing an object into a captured image 1022, entering a text memo into a text memo area 1024, and the like. Note that information on review of notes taken in the meeting by the participants is transmitted to the contents management server 6 to update the interest management DB 6003.

Further, at Step S16, the information sharing system displays the interest of the participant in the contents of the meeting, based on how the personal memo dm was taken by the participant and the review of the personal memo dm, so as to be utilized as will be described later.

For example, by abstracting the contents, the display of the interest of the participant in the contents of the meeting may be made browsable not only for the presenter and/or the organizer, but also for the participants. Alternatively, access restriction may be imposed on the display of the interest of the participants in the contents of the meetings, so as to make the display browsable only for the presenter and/or the organizer. By browsing the interest of the participant in the contents of the meeting, the presenter and/or the organizer can utilize it for approaching the participant (sales, etc.) and for feedbacking to the next meeting, as will be described later.

According to Steps S12 and S14, the operability and sense of use felt by the user can be improved by a UI with which a personal memo dm can be taken easily. Also, according to Step S16, by visualizing and providing the interest of the participant in the contents of the meeting, it is possible to facilitate the utilization for approaching the participant (sales, etc.) and for feedbacking to the next meeting.

FIG. 23 is a sequence chart of an example of a process starting from meeting preparation until the personal board screen 1000 is displayed. FIG. 23 illustrates a case in which the permanent terminal 4 is used. At Step S20, the permanent terminal 4 is in a state of being ready for bidirectional communication with the contents management server 6 at all times, regardless of whether a meeting is in session or not.

Figure 24:
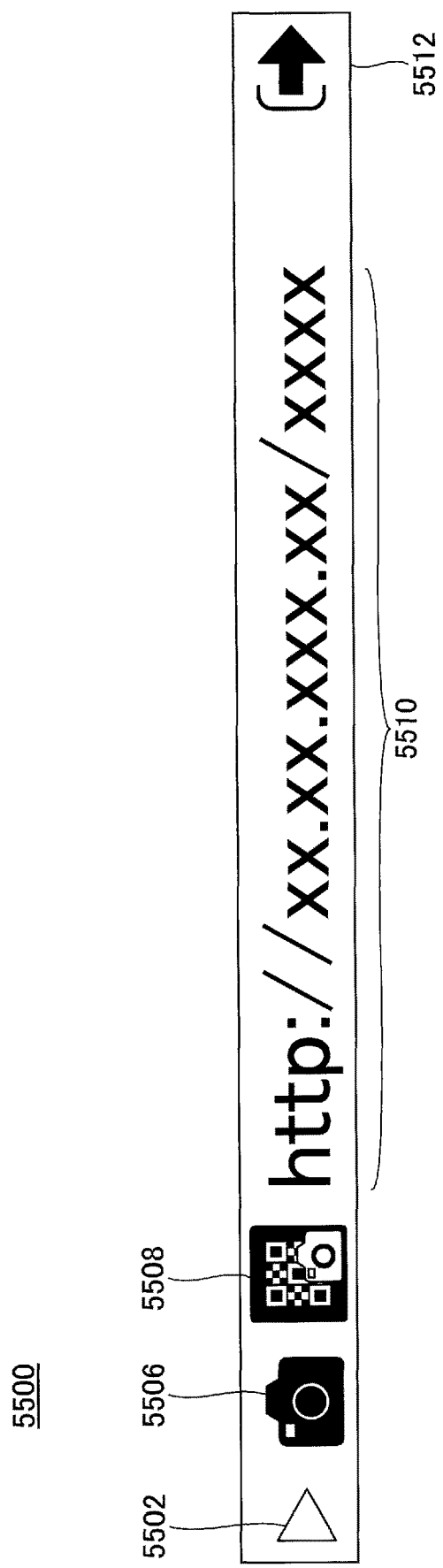
FIG. 24 is an image diagram of an example of an address bar displayed on a permanent terminal.

The permanent terminal 4 may display an address bar 5500, for example, as illustrated in FIG. 24 to inform the user participating in the meeting, of the connection address of the contents management server 6 and the ID of the permanent terminal 4. FIG. 24 is an image diagram of an example of an address bar 5500 displayed on the permanent terminal 4. The address bar 5500 includes a button 5502, a capture button 5506, a two-dimensional code display button 5508, a connection address 5510 including the ID of permanent terminal 4, and an exit button 5512.

The button 5502 is a button to display or not to display the right side of the button 5502 of the address bar 5500. The capture button 5506 is a button to capture the shared screen ss and to paste it to the shared memo cm. The two-dimensional code display button 5508 is a button to display the connection address 5510 as a two-dimensional code including the ID of the permanent terminal 4. By capturing an image of the two-dimensional code on the personal terminal 2, the user can input the connection address 5510 including the ID of the permanent terminal 4 into the personal terminal 2. The exit button 5512 is a button to exit the meeting in which the permanent terminal 4 participates.

For example, the address bar 5500 is displayed by an application installed in the permanent terminal 4 (including the case where it is installed in the stick PC 730 connected to the permanent terminal 4). Similar functions may be implemented by a web application. Also, applications installed in the permanent terminal 4 may be provided by using a cloud service. Note that in the case where the participant is aware of the connection address 5510 including the ID of the permanent terminal 4 in advance, the permanent terminal 4 is not necessarily an indispensable element.

At Step S22, the presenter (user A) who is operating the personal terminal 2*a* activates the web browser. At Step S24, the presenter who is operating the personal terminal 2*a* inputs the connection address 5510 into the web browser including the ID of the permanent terminal 4 displayed on the permanent terminal 4, to issue a command to start the meeting.

Proceeding to Step S26, based on the connection address 5510 including the ID of the permanent terminal 4 input into the web browser, the personal terminal 2*a* accesses the contents management server 6 to make a request for participating in the meeting associated with the ID of the permanent terminal 4 and to make a request for establishing WebSocket communication. Note that WebSocket communication is a communication protocol for bidirectional communication (socket communication) between a web server and a web browser, which is different from HTTP.

According to WebSocket communication, while a page is being displayed, which is a target of WebSocket communication between the contents management server 6 and the personal terminal 2 (here, the personal board screen 1000), a TCP connection is established and both the contents management server 6 and the web browser of the personal terminal 2 continue to communicate at appropriate timings. In other words, at the time when accessing the personal board screen 1000, communication is performed via HTTP including the handshake. Then, after opening the personal board screen 1000, the protocol is switched to WebSocket communication to perform bidirectional communication. When the personal board screen 1000 is closed, the WebSocket communication on the page ends.

Proceeding to Step S28, in response to the request for participation at Step S26, the contents management server 6 determines whether or not a meeting associated with the ID of the permanent terminal 4 transferred from the personal terminal 2*a* is in session, with reference to the meeting association DB 6008 in FIG. 19. Here, it is assumed that a meeting associated with the ID of the permanent terminal 4 is not in session, in the following description. A meeting associated with the ID of the permanent terminal 4 is not in session; therefore, the contents management server 6 generates a meeting, associates the meeting ID of the generated meeting with the ID of the permanent terminal 4, and sets the association in the meeting association DB 6008 in FIG. 19.

Also, the contents management server 6 saves meeting data, for example, as illustrated in FIG. 25A, in the meeting DB 6006. FIGS. 25A to 25C are configuration diagrams of an example of meeting data stored in the meeting DB 6006. The contents management server 6 returns the meeting URL and the meeting ID, as an example of the information generated at Step S28 to participate in the meeting, to the personal terminal 2*a*.

At Step S30, the presenter operates the personal terminal 2a to issue a command to connect to the meeting. Proceeding to Step S32, the personal terminal 2a makes a request for connecting to the meeting to the contents management server 6, by using the meeting URL and the meeting ID returned from the contents management server 6 and the presenter user ID.

Proceeding to Step S34, the contents management server 6 registers the user ID of the presenter, for example, in the field of participants provided in the meeting data in FIG. 25B. In other words, the user ID registered in the field of participants in the meeting data saved in the meeting DB 6006 represents the participant participating in the meeting of the meeting data.

The contents management server 6 gives notice of the participation in the meeting to the presenter who is operating the personal terminal 2a, for example, by causing the personal terminal 2a to display a display as illustrated in FIG. 9A on the upper right of the personal board screen 1000. Also, at Step S36, the contents management server 6 gives notice of the participation of the new user to the permanent terminal 4 already connected to the meeting. Proceeding to Step S38, the permanent terminal 4 displays the participation of the new user.

At Step S40, the participant (user B) who is operating the personal terminal 2b activates the web browser. At Step S42, the participant who is operating the personal terminal 2b inputs the connection address 5510 including the ID of the permanent terminal 4 displayed on the permanent terminal 4 into the web browser, to issue a command to participate in the meeting.

Proceeding to Step S44, based on the connection address 5510 including the ID of the permanent terminal 4 input into the web browser, the personal terminal 2b accesses the contents management server 6 to make a request for participating in the meeting associated with the ID of the permanent terminal 4 and to make a request for establishing WebSocket communication. In response to the request for participation at Step S44, the contents management server 6 determines whether or not a meeting associated with the ID of the permanent terminal 4 transferred from the personal terminal 2b is in session, with reference to the meeting association DB 6008 in FIG. 19. Here, the meeting ID generated at Step S28 associated with the ID of the permanent terminal 4 has been set in the meeting association DB 6008 in FIG. 19; therefore, it is determined that the meeting associated with the ID of the permanent terminal 4 is in session. Because of this, the contents management server 6 does not generate a meeting.

At Step S46, the participant operates the personal terminal 2b to issue a command to connect to the meeting. Proceeding to Step S48, by using the meeting URL and the meeting ID returned from the contents management server 6 and the participant user ID, the personal terminal 2b makes a request for connecting to the meeting to the contents management server 6.

Proceeding to Step S49, the contents management server 6 registers the user ID of the participant who is operating the personal terminal 2b, for example, in the field of participants in the meeting data in FIG. 25C. The contents management server 6 gives notice of the participation in the meeting to the participant who is operating the personal terminal 2b, for example, by causing the personal terminal 2b to display a display as illustrated in FIG. 9A on the upper right of the personal board screen 1000.

Also, at Step S50, the contents management server 6 gives notice of the participation of the new user to the permanent terminal 4 already connected to the meeting. Proceeding to Step S52, the permanent terminal 4 displays the participation of the new user. Further, at Step S54, the contents management server 6 gives notice of the participation of the new user to the personal terminal 2a already connected to the meeting. Proceeding to Step S56, the personal terminal 2a displays the participation of the new user.

Note that the sequence chart in FIG. 23 is merely an example; as another example, processing executed at Step S26 based on the connection address 5510 including the ID of the permanent terminal 4 may be separate into a step of making a request for accessing the contents management server 6 and for establishing WebSocket communication, and a step of making a request for participating in the meeting associated with the ID of the permanent terminal 4.

Also, a request for participation by a participant can be made by a method other than the method as described above, in which the connection address displayed on the permanent terminal 4 is input into the browser on each personal terminal, and a request for participation is made based on capturing an image of a two-dimensional code displayed on the permanent terminal 4 on each personal terminal.

For example, by installing a short-distance wireless device having short-distance wireless functions such as NFC and BLE in the meeting room, and by holding the personal terminal over the short-distance wireless device, it is also possible to obtain information for connection including the address, the terminal ID, and the like, from the short-distance wireless device into the personal terminals, and to make a request for participation from the browser of each personal terminal.

In this case, upon obtaining the connection information from the short distance wireless device, the browser may be activated on the personal terminal, for accessing by passing the connection information to the browser, and in response to a request for participation, screens such as the personal board and the authentication information input screen (login screen) may be automatically opened on the browser. Note that it is also possible to install a device to display the connection address and the two-dimensional code that can be visually recognized by a participant together with a short-distance wireless device to obtain the connection information and the like in a single meeting room, so as to have more than one methods available for making a request for participating in a meeting.

Figure 27:
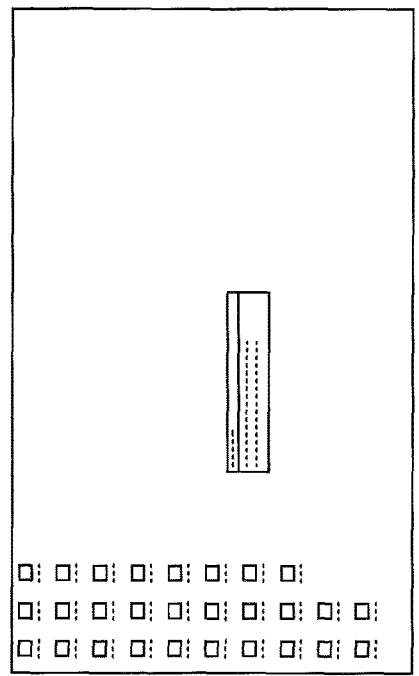
FIG. 27 is an image diagram of an example of a screen for selecting a target to be transmitted to a shared screen ss.

FIG. 26 is a sequence chart of an example illustrating a process until a projection screen 1040 is displayed on a personal board screen 1000. Proceeding to Step S142, the presenter who is operating the personal terminal 2a selects a target screen to be transmitted to the shared screen ss, in a screen 1200 as illustrated in FIG. 27. FIG. 27 is an image diagram of an example of a screen for selecting a target to be transmitted to the shared screen ss. The screen in FIG. 27 illustrates an example of selecting a target screen to be transmitted to the shared screen ss from among "Share the entire screen", "Share the application windows", and "Share the browser tabs".

The screen 1200 in FIG. 27 is an example in which the presenter has selected "Share the entire screen". The screen 1200 illustrates an example in which "Screen 1" as the entire desktop and another "Screen 2" displayed on a dual display constituted options. Also, in the case of selecting "Share the application windows" on the screen 1200, multiple active applications are displayed as options (including applications for displaying material files for meetings and presentations).

Also, in the case of selecting "Share the browser tabs" on the screen 1200, the active web browser tabs are displayed as options.

Proceeding to Step S144, the personal terminal 2a specifies a meeting ID or a personal board ID to transmit by WebRTC streaming of the target screen to be transmitted to the shared screen ss of the specified meeting. Note that WebRTC is a standard for implementing high-speed data communication via a web browser, which is one of the APIs of HTML. WebRTC is capable of transmitting and receiving data having a large capacity such as video and audio in real time.

Proceeding to Step S146, the contents management server 6 performs streaming delivery by WebRTC to the personal board screens 1000 of the personal terminal 2a, the personal terminal 2b, and the permanent terminal 4 associated with the meeting ID specified at Step S144.

At Step S148, the personal terminal 2a can display a projection screen 1040 delivered by the streaming in the projection area of the personal board screen 1000 displayed by the web browser, for example, as illustrated in FIG. 10. Also, at Step S150, the personal terminal 2b can display a projection screen 1040 delivered by the streaming in the projection area of the personal board screen 1000 displayed by the web browser, for example, as illustrated in FIG. 10. Also, at Step S152, the permanent terminal 4 can display a projection screen 1040 delivered by the streaming in the projection area of the personal board screen 1000 displayed by the web browser, for example, as illustrated in FIG. 10.

For example, the participant who is operating the personal terminal 2b can import the captured image 1022 of the projection screen 1040 in a procedure illustrated in the sequence chart in FIG. 28, and can write a note in the captured image 1022 and the text memo area 1024.

FIG. 28 is a sequence chart of an example of a process of taking in the captured image 1022 of the projection screen 1040 and writing a note in the captured image 1022 and the text memo area 1024.

At Step S60, the participant who is operating the personal terminal 2b performs a press operation on the capture button 1016. The personal terminal 2b makes a request for image capturing to the contents management server 6. At Step S62, the contents management server 6 captures an image of the projection screen 1040 at that time and returns an image file of the captured image 1022 to the personal terminal 2b.

In the sequence chart in FIG. 28, although an image of the projection screen 1040 is captured by the contents management server 6, the image of the projection screen 1040 may be captured by the personal terminal 2b or the permanent terminal 4. For example, in the case of capturing the image on the projection screen 1040 by the permanent terminal 4, the contents management server 6, which has received the request for image capturing from the personal terminal 2b, makes a request for image capturing to the permanent terminal 4.

The permanent terminal 4 captures the image of the projection screen 1040 and returns an image file of the captured image 1022 to the contents management server 6. The contents management server 6 transmits the image file of the captured image 1022 that has been returned, to the personal terminal 2b. In this way, in the case of capturing the image on the projection screen 1040 by the permanent terminal 4, for example, it is possible to capture an image of the projection screen 1040 that can be simultaneously browsed on the permanent terminal 4 by the presenter and/or the participants.

Having received the image file of the captured image 1022 from the contents management server 6, the personal terminal 2b proceeds to Step S66, and by using the received image file, additionally displays the captured image 1022 of the projection screen 1040 in the memo area, for example, as illustrated in FIG. 11. Also, for example, as illustrated in FIG. 11, the personal terminal 2b displays the text memo area 1024 accompanying the captured image 1022 on the same sheet 1020 as the additionally displayed captured image 1022.

Proceeding to Step S68, the participant who is operating the personal terminal 2b may draw an object in the captured image 1022 on the additionally displayed sheet 1020, or may input a text note into the text memo area 1024.

In the sequence in FIG. 28, only the image file of the captured image 1022 is transmitted to the personal terminal 2b from the contents management server 6. In this case, a JavaScript that is included in the data of the web page and operates on the browser of the personal terminal 2b may generate the text memo area.

Also, the contents management server 6 may transmit data of the sheet 1020 including the image of the captured image 1022 and the text memo area 1024. Also, the display position of the image of the captured image 1022 and the sheet 1020 at this time may be determined by a program such as a script executed by the browser of the personal terminal 2b, or the contents management server 6 may specify the display position to be transmitted to the personal terminal 2b.

Also, the contents management server 6 may generate a sheet 1020 in which the obtained captured image 1022 image and the text memo area 1024 are combined. Note that an area other than the captured image 1022 and the text memo area 1024 of the sheet 1020 may be set as an area that can be handwritten or an area that cannot be handwritten.

In response to a click performed in an area other than the additionally displayed sheet 1020 (i.e., the selected sheet 1020), the personal terminal 2b determines that editing is completed temporarily, and proceeds to Step S70. At Step S70, the personal terminal 2b transmits information on the additionally displayed sheet 1020 and the edited contents on the sheet 1020 to the contents management server 6. Note that at Step S70, the personal terminal 2b may transmit information on all sheets 1020 and edited contents on all sheets 1020 to the contents management server 6.

The contents management server 6 updates the contents of the various DBs described above, based on the received information on the sheet 1020 and the edited contents on the sheet 1020. In this way, the captured image 1022 captured on the personal board screen 1000, handwritten notes on the captured image 1022, and text notes input in the text memo area 1024 by the participant are associated with the sheet 1020, and saved in the contents management server 6.

Figure 29:
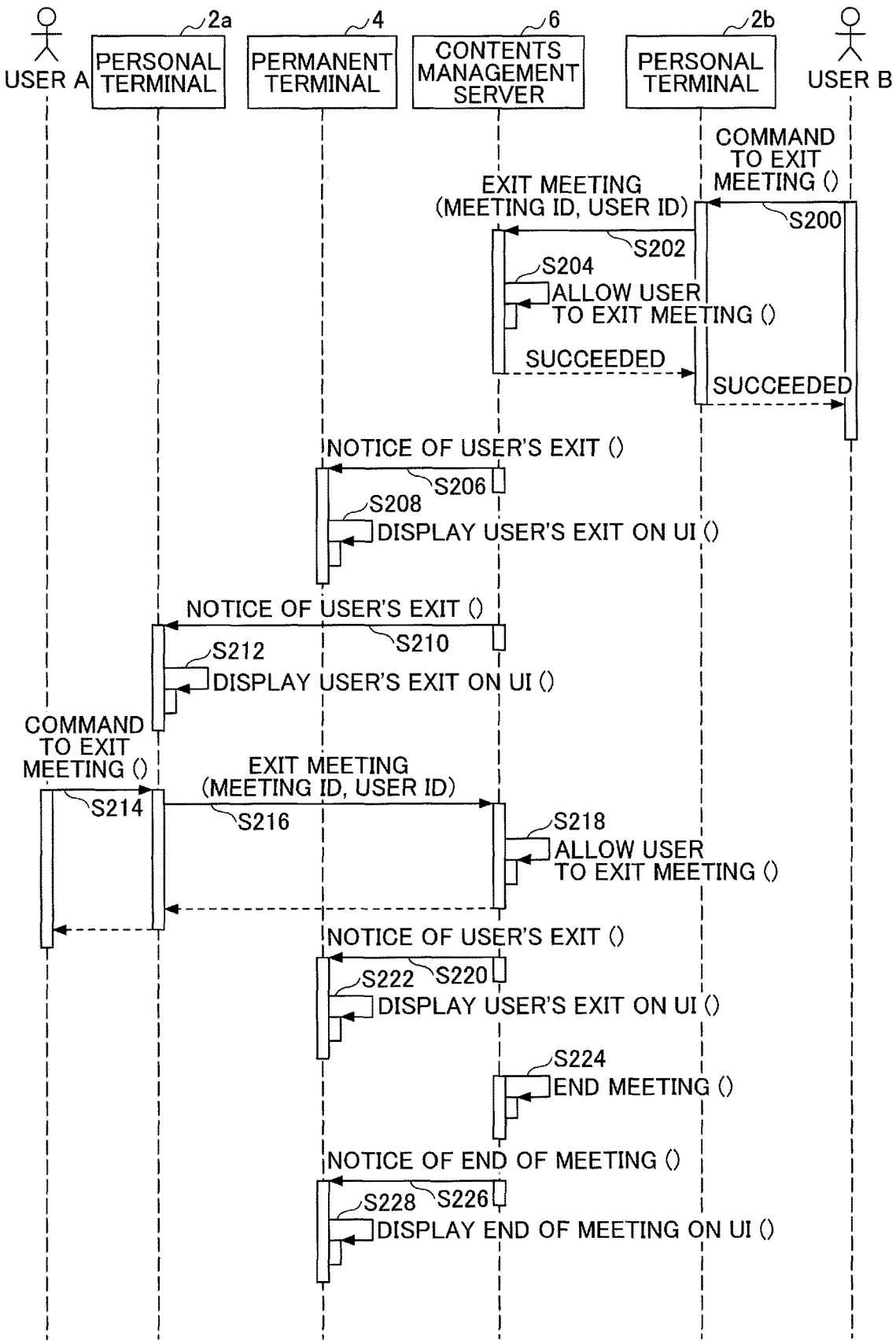
FIG. 29 is a sequence chart of an example of a process in which a user exits a meeting in session and the meeting ends.

FIG. 29 is a sequence chart of an example of a process in which a user exits a meeting in session and the meeting ends. FIG. 29 illustrates a case in which the permanent terminal 4 is used. At Step S200, a participant who is operating the personal terminal 2b performs an exit operation to exit the meeting, to issue a command to exit the meeting.

Proceeding to Step S202, the personal terminal 2b makes a request for exiting the meeting to the contents management server 6 by using the meeting ID and the user ID. Proceeding to Step S204, the contents management server 6 selects the user ID of the participant as the user B of the personal terminal 2b, for example, in the field of participants in the meeting data in FIG. 30A.

Then, the contents management server 6 assigns an exit flag "left" to the user ID of the participant who is operating the personal terminal 2b registered in the field of participants, so as to allow the participant as the user B of the personal terminal 2b to exit the meeting. The exit flag "left" represents that a user who has participated in a meeting has already exited the meeting. The exit flag "left" is deleted in the case where the user who has exited the meeting participates in the same meeting again. In addition to the case where an explicit request for exit is made from the personal terminal 2b as in Step S202, in the case where it is determined that the session between the personal terminal 2b and the contents management server 6 becomes disconnected, in other words, in the case where no notice comes from the personal terminal 2b for a certain period of time or longer, the contents management server 6 determines that the participant corresponding to the personal terminal 2b with which the session is disconnected, has exited the meeting. Therefore, in the case where the session between the personal terminal 2b and the contents management server 6 is disconnected, the exit flag "left" is assigned to the user ID corresponding to the personal terminal 2b with which the session is disconnected. Here, assignment of the exit flag "left" to the user ID corresponding to the personal terminal 2b with which the session is disconnected may be done after a certain period of time has elapsed since the session was disconnected, and in the case where the contents management server 6 is reconnected from the personal terminal 2b within a certain period of time, the exit flag "left" may not be assigned.

Also, at Step S206, the contents management server 6 gives notice of the exit of the user B to the permanent terminal 4 connected to the meeting. Proceeding to Step S208, the permanent terminal 4 displays the exit of the user B. Furthermore, at Step S210, the contents management server 6 gives notice of the exit of the user B to the personal terminal 2a connected to the meeting. Proceeding to Step S212, the personal terminal 2a displays the exit of the user B.

At Step S214, the presenter as the user A who is operating the personal terminal 2a performs an exit operation to exit the meeting, to issue a command to exit the meeting. Proceeding to Step S216, the personal terminal 2a makes a request for exiting the meeting to the contents management server 6 by using the meeting ID and the user ID. The contents management server 6 proceeds to Step S218, to select the participant ID of the personal terminal 2a, for example, in the field of participants in the meeting data in FIG. 30B.

Then, the contents management server 6 assigns the exit flag "left" to the user ID of the presenter of the personal terminal 2a registered in the field of participants, so as to allow the participant of the personal terminal 2a to exit the meeting.

Also, at Step S220, the contents management server 6 gives notice of the exit of the presenter to the permanent terminal 4 connected to the meeting. Proceeding to Step S222, the permanent terminal 4 displays the exit of the presenter (user A).

At Step S224, the contents management server 6 determines that the meeting has ended because the exit flag "left" has been assigned to all the user IDs registered in the field of participants. The contents management server 6 ends the meeting by assigning the flag "Finished" representing the end of meeting to the meeting data in FIG. 30C.

Also, at Step S226, the contents management server 6 gives notice of the end of the meeting to the permanent terminal 4 connected to the meeting. Proceeding to Step S228, the permanent terminal 4 displays the end of the meeting. Once the flag "Finished" representing the end of meeting has been assigned to the meeting data, the meeting ID, which has been managed in association with the ID of the permanent terminal 4 as an example of the identifier, is deleted in the meeting association DB 6008 in FIG. 19.

Also, in the case where the exit flag "left" has been assigned to all user IDs and the flag "Finished" is assigned to the meeting data, if there is the shared screen of the ongoing meeting displayed on the permanent terminal 4, the shared screen may be deleted, or the screen may be transition to another screen such as a screen for the next meeting or a waiting screen, for example, a service guidance screen or the like.

Therefore, if a request for participating in the meeting associated with the ID of the permanent terminal 4 is made after the meeting has ended, the contents management server 6 determines that the meeting associated with the ID of the permanent terminal 4 is not in session and generates a new meeting.

In this way, by managing the exit from a meeting of each participant who has participated in the meeting, it is possible for the information sharing system according to the present embodiment to end the meeting when all participants who have participated in the meeting have exited the meeting. Although it is determined at Step S224 that the meeting has ended when the exit flag "left" has been assigned to the user ID of every participant participating in the meeting, in determining the end of the meeting, it may be determined that the meeting has ended after a predetermined period of time has elapsed after the exit flag "left" has been assigned to the user ID of every participant participating in the meeting. This enables, in the case where a participant accidentally presses the exit button, or in the case where a participant accidentally closes the browser, to continue the meeting if reconnection is made within a certain period of time, and to improve precision in determining the end of the meeting.

Note that in the case where the exiting user is the presenter or the organizer, namely, in the case where the role of the exiting user is presenter or organizer, even if the other participants of the meeting have not exited, the contents management server 6 may stop the screen sharing function, hide buttons to start screen sharing, or change the display color. In this way, accidental start of screen sharing by a person who is not the presenter may be prevented.

Displaying for utilization of the interest of the participant in review of notes in a meeting and contents of the meeting by the participants and the presenters may be performed, for example, as follows. Note that here, an example will be described in which a participant reviews notes in a meeting from the personal terminal 2b.

Figure 31:
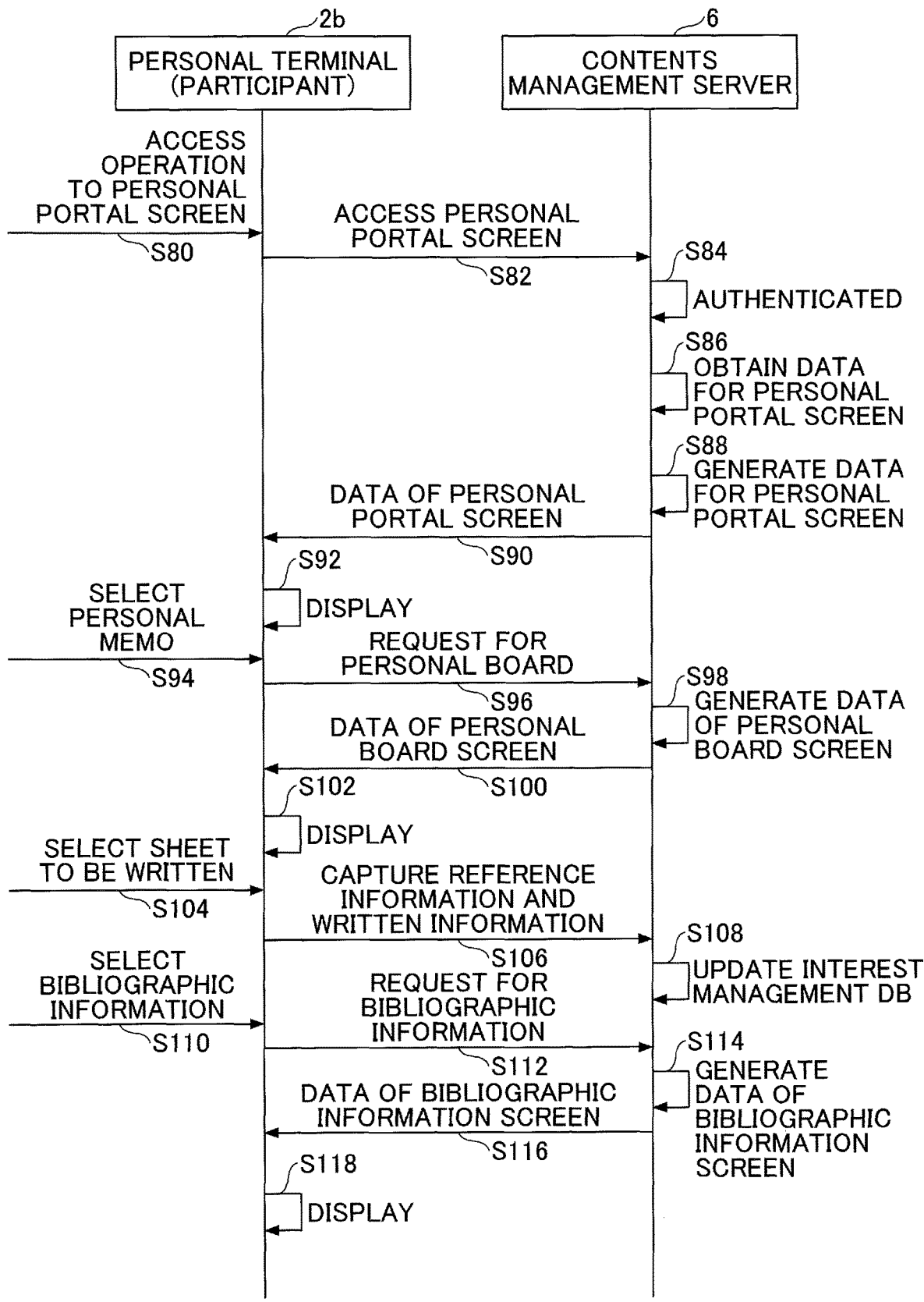
FIG. 31 is a sequence chart of an example of a process in which a participant reviews notes in a meeting on a personal terminal.

FIG. 31 is a sequence chart of an example of a process in which a participant reviews notes in a meeting on the personal terminal 2b. At Step S80, the participant who is operating the personal terminal 2b performs an access operation to a personal portal screen 5000, as illustrated in FIG. 32. FIG. 32 is a diagram illustrating an example of a display on the personal portal screen 5000.

In the personal portal screen 5000 in FIG. 32, a list of meetings 5010 participated by the participant who is operating the personal terminal 2b is displayed. The list of meetings 5010 can be generated by using the personal memo management DB 6004, the shared memo management DB 6005, and the interest management DB 6003 described above.

In the example of the list of meetings 5010 in FIG. 32, for each meeting, items of date and time, meeting name, location, personal memo button 5030, shared memo button 5040, self-evaluation, and bibliographic information button 5050 are displayed. According to the personal portal screen 5000 in FIG. 32, it is possible for the participant to confirm the list of meetings 5010 in which he/she participated. The field of self-evaluation is an example of evaluation information.

Note that the personal memo button 5030 is linked with the personal board screen 1100 to display the personal memo dm of the meeting. The shared memo button 5040 is linked with the shared memo screen to display the shared memo cm of the meeting. The bibliographic information button 5050 is linked with the bibliographic information screen 5100 to display the bibliographic information on the meeting.

In response to a press operation on the bibliographic information button 5050 on the personal portal screen 5000, the personal terminal 2b displays the bibliographic information screen 5100 corresponding to the pressed bibliographic information button 5050. FIG. 33 is a diagram illustrating an example of a display of a bibliographic information screen 5100. The "session information" displayed at the top of the bibliographic information screen 5100 is, for example, the "bibliographic information on the meeting" of the shared memo management DB 6005 in FIG. 15. Also, the "capture information" displayed at the bottom of the bibliographic information screen 5100 is generated, for example, by using the interest management DB 6003 in FIG. 18. Note that the "capture information" displayed at the bottom of the bibliographic information screen 5100 will be described in detail later.

As an access operation to the personal portal screen 5000 at Step S80, the connection address to the personal portal screen 5000 may be input on the web browser, or the personal portal screen 5000 may be selected by using a bookmark.

Proceeding to Step S82, the web browser of the personal terminal 2b accesses the personal portal screen 5000. At Step S84, the contents management server 6 authenticates the participant who is operating the personal terminal 2b. The description here will continue assuming that the authentication has been successful. The contents management server 6 proceeds to Step S86, reads data for the personal portal screen 5000 from the memory 6000.

For example, the contents management server 6 identifies the meeting ID corresponding to the meeting in which the user participated from the personal memo management DB 6004 in the memory 6000, by using the user ID of the authenticated participant as the key. Also, by using the identified meeting ID as the key, the contents management server 6 identifies the bibliographic information on the meeting from the shared memo management DB 6005 in the memory 6000.

In this way, once the user ID of the participant has been identified, the contents management server 6 can obtain data required for generating the personal portal screen 5000 in FIG. 32 from the various DBs in the memory 6000.

Proceeding to Step S88, the contents management server 6 generates data of a web page of the personal portal screen 5000 from the obtained data for the personal portal screen 5000. Proceeding to Step S90, the contents management server 6 transmits the data of the web page of the personal portal screen 5000 to the personal terminal 2b.

Proceeding to Step S92, the personal terminal 2b can display the personal portal screen 5000 as illustrated in FIG. 32. On the personal portal screen 5000 in FIG. 32, the list of meetings 5010 in which the participant who is operating the personal terminal 2b participated is displayed. At Step S94, the participant who is operating the personal terminal 2b performs a pressing operation on the personal memo button 5030 of a meeting of which he/she wants to display the personal board screen 1100.

Proceeding to Step S96, the web browser of the personal terminal 2b makes a request for the personal board screen 1100 linked with the personal memo button 5030 on which the press operation has been received, to the contents management server 6. Proceeding to Step S98, the contents management server 6 generates data of a web page of the personal board screen 1100 requested by the personal terminal 2b. Proceeding to Step S100, the contents management server 6 transmits the data of the web page of the personal board screen 1100 to the personal terminal 2b.

Proceeding to Step S102, the personal terminal 2b can display the personal board screen 1100 as illustrated in FIG. 12. The description here will continue assuming that the participant of the personal terminal 2b has selected the sheet 1120 of the personal board screen 1100, and on the selected sheet 1120, has made a handwritten note in the captured image 1022 and/or a text note (writing on the sheet 1120) in the text memo area 1024.

At Step S104, the participant of the personal terminal 2b selects the sheet 1120 of the personal board screen 1100 and writes notes in the selected sheet 1120. The capture reference information on the sheet 1120 referenced by the participant of the personal terminal 2b at Step S104, and the information written on the selected sheet 1120, are transmitted at Step S106 from the personal terminal 2b to the contents management server 6.

As the capture reference information, for example, in the case where it is determined by the personal terminal 2b that a specific captured image is displayed on the screen of the personal terminal 2b, information representing that the captured image has been displayed once may be transmitted to the contents management server 6; or in a specific area of the personal terminal 2b, for example, in an area within a certain range from the center of the screen of the personal terminal 2b in the case where it is determined by the personal terminal 2b that the specific captured image has been displayed for a certain period of time or longer, information representing that the captured image has been displayed once may be transmitted to the contents management server 6.

Also, the capture reference information may also include the display time of the captured image. The personal terminal 2b may count the display time of the captured image if it is displayed on one of the screens of the personal terminals 2b, or may count the display time only while being displayed in a specific area of the screen of the personal terminal 2b, for example, in an area within a certain range from the center.

Proceeding to Step S108, based on the capture reference information and the written information (review information on the meeting memo by the participant) received from the personal terminal 2b, the contents management server 6 updates the interest management DB 6003 in FIG. 18 and the like.

Also, here, at Step S110, the participant of the personal terminal 2b performs a pressing operation on the bibliographic information button 5050 of the meeting of which he/she wants to display the bibliographic information screen 5100. Proceeding to Step S112, the web browser of the personal terminal 2b makes a request for the bibliographic information screen 5100 corresponding to the bibliographic information button 5050 on which the pressing operation has been received, to the contents management server 6.

Proceeding to Step S114, the contents management server 6 generates data of a web page of the bibliographic information screen 5100 requested from the personal terminal 2b. Proceeding to Step S116, the contents management server 6 transmits the data of the web page of the bibliographic information screen 5100 to the personal terminal 2b. Proceeding to Step S118, the personal terminal 2b can display the bibliographic information screen 5100 as illustrated in FIG. 33.

Note that although the sequence chart in FIG. 31 illustrates an example in which the user of the personal terminal 2b displays the bibliographic information screen 5100 in FIG. 33, the presenter of the personal terminal 2a may display the bibliographic information screen 5100 in FIG. 33. Also, the contents to be displayed on the bibliographic information screen 5100 in FIG. 33 may be changed in accordance with the role of the user who is operating the personal terminal 2, which may be a presenter, a participant, an organizer, or the like.

Also, on the bibliographic information screen 5100 in FIG. 33, by displaying, for example, the "capture information" as illustrated in FIG. 34 or 35, or the "interest information" representing the degree of interest in the presented contents of the participants and the like by using the interest management DB 6003 illustrated in FIG. 18, it is possible to facilitate displaying for utilization of the interest of the participants in the contents of the meeting.

FIG. 34 is an explanatory diagram of an example of captured information on the bibliographic information screen 5100. In FIG. 34, images 1022 of the projection screen 1040 captured by participants in a meeting and the numbers of capturing times of the respective captured images 1022 are displayed. According to the capture information illustrated in FIG. 34, based on the images 1022 of the captured projection screen 1040 and the numbers of capturing times of the respective captured images 1022, it is possible to measure a projection screen 1040 having a high interest.

FIG. 35 is an explanatory diagram of an example of captured information on a bibliographic information screen 5100. In FIG. 35, images 1022 of the projection screen 1040 captured in the meeting and the contents of the text notes input into the text memo area 1024 accompanying the captured images 1022 are displayed for each participant. Also, in FIG. 35, the meeting participation time, the meeting exit time, and the degree of interest are displayed for each participant.

The degree of interest is calculated and displayed based on, for example, the number of captured images 1022, the number of notes, and the length of time participating in the meeting. Note that as for the capture information on the bibliographic information screen 5100, the contents to be displayed may be changed based on the role of the user who is operating the personal terminal 2, which may be an organizer, a presenter, a participant, or the like. For example, for an organizer or presenter, the capture information on all participants may be displayed, or for a participant, only his/her capture information may be displayed.

In the example in FIG. 35, the number of captured images 1022 of the user ID "User-a" is greater than those of the other participants, and the number of notes is also greater than those of the other participants. Further, the time participating in the meeting is longer than those of the other participants. Therefore, it may be determined that the user has a higher degree of interest in the meeting contents than the other participants. The capture information displayed at the bottom of the bibliographic information screen 5100 simply needs to be, for example, a part of or the entirety of the information in the interest management DB 6003 in FIG. 18.

Note that the bibliographic information including captured images, notes, meeting participation times, meeting exit times, and interests in the meeting is generated for each meeting and for each user. For example, in the case where the user ID "User-a" has participated in and exited a meeting X and participates in a new meeting Y, two items of bibliographic information are generated and displayed as different items of bibliographic information. One is bibliographic information generated by the contents management server based on information such as captured images obtained from the personal terminal of the user ID "User-a" (capture information and interest information) before exiting the meetings X; and the other is bibliographic information generated by the contents management server based on information obtained from the personal terminal of the user ID "User-a" after having participated in the meeting Y.

<Summary>

According to the information sharing system according to the present embodiment, a concept of a real meeting can have one-to-one correspondence with a concept of a virtual meeting room in which the real meeting took place. Further, without relying on a meeting reservation system or on a command to end the meeting issued by a user, it is possible to end the meeting in the information sharing system when the number of participants in the virtual meeting room becomes zero.

Therefore, it is possible to avoid confusion of real meetings held in a virtual meeting room. For example, even when the previous real meeting has ended and the next real meeting is started, no confusion arises due to misunderstanding that the previous real meeting is continuing. Also, the shared memo cm in the previous real meeting will not be projected as the shared memo cm in the next real meeting. Also, in the case where another meeting is held consecutively in the same location (meeting room), the exit of each terminal is determined to automatically end the meeting. Therefore, information on the previous meeting is not left on the screen, and thereby, leakage of the meeting information can be prevented.

Other Embodiments

As above, the embodiments have been described. Note that the present inventive concept is not limited in any way to these embodiments, and various modifications and substitutions can be made within a range that does not deviate from the gist of the present inventive concept. For example, it is possible to consider the following use scenes of the information sharing system according to the present embodiments as follows.

In a general seminar, customers may correspond to the participants in the present embodiments, and sales personnel may correspond to the presenter or organizer in the present embodiments, who can visualize the interests of the participants. In school use, students may correspond to the participants in the present embodiments and a teacher may correspond to the presenter or organizer in the present embodiments, who can analyze concentration of the students in class. At a general meeting, employees may correspond to the participants in the present embodiments, and a manager may correspond to the presenter or organizer in the present embodiment, who can recognize states of meetings within a company.

The functions of the present embodiment described above may be implemented by one or more processing circuits. Here, the "processing circuit" in the present description includes a processor programmed to execute the functions by software, such as a processor implemented by an electronic circuit; an ASIC (Application Specific Integrated Circuit), a DSP (Digital Signal Processor), or an FPGA (field programmable gate array) designed to execute the functions described above; devices such as conventional circuit modules; and the like.

A virtual meeting room is an example of a virtual place described in the claims. A meeting held in a virtual meeting room is an example of a meeting in a virtual place. A projection area is an example of a first area. A memo area is an example of a second area. The determiner 65 is an example of a manager. The web page generator 66 is an example of a generator. The transceiver 61 is an example of a transmitter.

As above, favorable embodiments of the present inventive concept have been described in detail. Note that the present inventive concept is not limited to the specific embodiments described above, and various modifications and changes may be made within the scope of the subject matters of the present inventive concept as described in the claims.

The present application claims priority under 35 U.S.C. § 119 of Japanese Patent Application No. 2019-036791 filed on Feb. 28, 2019, Japanese Patent Application No. 2019-103115 filed on May 31, 2019, and Japanese Patent Application No. 2020-004406 filed on Jan. 15, 2020, the entire contents of which are hereby incorporated by reference.

What is claimed is:

1. An information processing apparatus to manage a plurality of users who operate a plurality of communication terminals, respectively, to participate in a meeting held in a virtual place, the information processing apparatus comprising:
a memory; and
a processor configured to execute
managing a participating user who participates in the meeting, based on a notice from a communication terminal operated by the participating user, the notice using a unique identifier for the virtual place, and the unique identifier being unique among identifiers each of which is assigned to each virtual place,
managing the meeting in a meeting association database where an identifier that is unique to the information processing apparatus and a meeting ID are associated with each other,
generating data for displaying a web page in a web browser of the communication terminal operated by the participating user, and
transmitting the generated data to the communication terminal operated by the participating user,
wherein the managing determines whether all participating users have exited the meeting based on notices from the plurality of communication terminals, to end the meeting, said each of the notices indicating that the participating user has exited the meeting and including user ID for the participating user,
wherein the managing includes providing a flag indicating that the participating user has exited the meeting to the participating user to whom the user ID corresponds,
wherein the managing includes determining whether each one of the all participating users is provided with the flag and ending the meeting upon determining that each one of the all participating users is provided with the flag,
wherein the managing includes deleting the meeting ID, from the meeting association database, that is associated with the identifier corresponding to the meeting upon determining that each one of the all participating users is provided with the flag,
wherein the processor is further configured to automatically end the meeting upon determining that each one of the all participating users is provided with the flag, and
wherein the managing includes stopping a screen sharing function to share a display by the plurality of communication terminals, or hiding or changing a color of a button to start the screen sharing function upon detecting that an exiting user who are provided with the flag is a presenter or an organizer while at least one of the participants of the meeting remains in the meeting.

2. The information processing apparatus as claimed in claim 1, wherein in a case of receiving notices from the communication terminal using the unique identifier for the virtual place, the managing manages a first meeting participated by the participating user before the first meeting ends, to be different from a second meeting participated by the participating user after the first meeting has ended.

3. The information processing apparatus as claimed in claim 1, wherein the managing refers to information in which a unique identifier for said each virtual place is associated with a unique identifier for each meeting,
generate a new meeting to be held in the virtual place to manage the participating user as participating in the new meeting in a case where the unique identifier for the virtual place used in the notice from the communication terminal, is not associated with a unique identifier for the meeting, and
manages the participating user as participating in the meeting that has been generated previously in a case where the unique identifier for the virtual place used in the notice from the communication terminal, is associated with the unique identifier for the meeting.

4. The information processing apparatus as claimed in claim 1, wherein the managing manages the participating user to exit the meeting, based on an explicit notice of exit from the meeting from the participating user operating the communication terminal.

5. The information processing apparatus as claimed in claim 1, wherein the managing manages the participating user to exit the meeting, based on a notice of termination of the web browser from the communication terminal operated by the participating user.

6. The information processing apparatus as claimed in claim 1, wherein the managing manages the participating user to exit the meeting, based on disconnection of the communication terminal operated by the participating user from a network.

7. The information processing apparatus as claimed in claim 1, wherein the web page includes
a first area configured to display a shared screen shared by the plurality of communication terminals, and
a second area configured to include at least an image of the shared screen displayed in response to a request for obtaining the image of the shared screen received by the communication terminal, and an editable area.

8. The information processing apparatus as claimed in claim 1, wherein the managing ends the meeting after a certain period of time has elapsed after having determined that said all participating users have exited the meeting, based on the notices from the plurality of communication terminals.

9. The information processing apparatus as claimed in claim 1, wherein the processor is further configured to execute:
creating a new meeting ID for a new meeting upon detecting a request for attending the meeting.

10. The information processing apparatus as claimed in claim 1, wherein the identifier an ID of a permanent terminal that is one of a MAC address of a LAN, a PIN code, and a character string.

11. An information processing method executed by an information processing apparatus including a memory and a processor to manage a plurality of users who operate a plurality of communication terminals, respectively, to participate in a meeting held in a virtual place, the information processing method comprising:
managing a participating user who participates in the meeting, based on a notice from a communication terminal operated by the participating user, the notice using a unique identifier for the virtual place, and the unique identifier being unique among identifiers each of which is assigned to each virtual place,
managing the meeting in a meeting association database where an identifier that is unique to the information processing apparatus and a meeting ID are associated with each other,
generating data for displaying a web page in a web browser of the communication terminal operated by the participating user, and
transmitting the generated data to the communication terminal operated by the participating user,
wherein the managing determines whether all participating users have exited the meeting based on notices from the plurality of communication terminals, to end the meeting, said each of the notices indicating that the participating user has exited the meeting and including user ID for the participating user,
wherein the managing includes providing a flag indicating that the participating user has exited the meeting to the participating user to whom the user ID corresponds,
wherein the managing includes determining whether each one of the all participating users is provided with the flag and ending the meeting upon determining that each one of the all participating users is provided with the flag,
wherein the managing includes deleting the meeting ID, from the meeting association database, that is associated with the identifier corresponding to the meeting upon determining that each one of the all participating users is provided with the flag,
wherein the method further comprises automatically end the meeting upon determining that each one of the all participating users is provided with the flag, and
wherein the managing includes stopping a screen sharing function to share a display by the plurality of communication terminals, or hiding or changing a color of a button to start the screen sharing function upon detecting that an exiting user who are provided with the flag is a presenter or an organizer while at least one of the participants of the meeting remains in the meeting.

12. An information processing system comprising:
a plurality of communication terminals; and
an information processing apparatus to manage a plurality of users who operate the plurality of communication terminals, respectively, to participate in a meeting held in a virtual place,
wherein the information processing apparatus includes
a memory; and
a processor configured to execute
managing a participating user who participates in the meeting, based on a notice from a communication terminal operated by the participating user, the notice using a unique identifier for the virtual place, and the unique identifier being unique among identifiers each of which is assigned to each virtual place,
managing the meeting in a meeting association database where an identifier that is unique to the information processing apparatus and a meeting ID are associated with each other,
generating data for displaying a web page in a web browser of the communication terminal operated by the participating user, and
transmitting the generated data to the communication terminal operated by the participating user,
wherein each of the plurality of communication terminals includes a display control device configured to display the web page, based on the data received from the information processing apparatus, and
wherein the managing determines whether all participating users have exited the meeting based on notices from the plurality of communication terminals, to end the meeting, said each of the notices indicating that the participating user has exited the meeting and including user ID for the participating user,
wherein the managing includes providing a flag indicating that the participating user has exited the meeting to the participating user to whom the user ID corresponds,
wherein the managing includes determining whether each one of the all participating users is provided with the flag and ending the meeting upon determining that each one of the all participating users is provided with the flag,
wherein the managing includes deleting the meeting ID, from the meeting association database, that is associated with the identifier corresponding to the meeting upon determining that each one of the all participating users is provided with the flag,
wherein the processor is further configured to automatically end the meeting upon determining that each one of the all participating users is provided with the flag, and
wherein the managing includes stopping a screen sharing function to share a display by the plurality of communication terminals, or hiding or changing a color of a button to start the screen sharing function upon detecting that an exiting user who are provided with the flag is a presenter or an organizer while at least one of the participants of the meeting remains in the meeting.

* * * * *